US008449023B2

(12) United States Patent
Shellenberger et al.

(10) Patent No.: US 8,449,023 B2
(45) Date of Patent: May 28, 2013

(54) VEHICLE EMERGENCY EGRESS SYSTEM

(75) Inventors: Russell W. Shellenberger, Simi Valley, CA (US); Carlo A. Scarinci, North Hollywood, CA (US); David R. Avitia, San Fernando, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 263 days.

(21) Appl. No.: 12/853,257

(22) Filed: Aug. 9, 2010

(65) Prior Publication Data
US 2011/0084521 A1 Apr. 14, 2011

Related U.S. Application Data

(60) Provisional application No. 61/251,184, filed on Oct. 13, 2009.

(51) Int. Cl.
*B60J 1/06* (2006.01)
(52) U.S. Cl.
USPC ............... 296/201; 296/146.16; 296/84.1
(58) Field of Classification Search
USPC ............ 296/201, 146.15, 146.16, 84.1, 86, 296/187.07; 89/36.09
See application file for complete search history.

(56) References Cited

U.S. PATENT DOCUMENTS

| 3,737,193 A | 6/1973 | Cain |
| 4,132,446 A | 1/1979 | Bauer |
| 4,283,885 A | 8/1981 | Remick et al. |
| 4,327,523 A | 5/1982 | Gravely |
| 4,336,644 A | 6/1982 | Medlin |
| 4,443,035 A | 4/1984 | Saemann |
| 4,468,886 A | 9/1984 | Tew |
| 5,169,205 A | 12/1992 | James |
| 5,594,193 A | 1/1997 | Sheridan |
| 5,642,915 A | 7/1997 | Ackermann et al. |
| 5,826,824 A | 10/1998 | Martin et al. |

(Continued)

FOREIGN PATENT DOCUMENTS

| DE | 37 35 133 A1 | 5/1989 |
| DE | 101 19 315 C1 | 7/2002 |

(Continued)

OTHER PUBLICATIONS

The International Search Report and the Written Opinion of the International Search Authority dated Dec. 1, 2010, for International Application No. PCT/US2010/044928, Filed Aug. 9, 2010.

*Primary Examiner* — Glenn Dayoan
*Assistant Examiner* — Gregory Blankenship
(74) *Attorney, Agent, or Firm* — Christie, Parker & Hale, LLP

(57) ABSTRACT

A vehicle emergency egress system. In one embodiment, an emergency egress system for providing an opening for egress from a vehicle includes a frame configured to be directly attached to the vehicle, the frame having a cavity formed therein and defined on a first side by a back surface facing an exterior of the vehicle, the back surface having an opening formed therethrough; a panel removably received in the cavity for covering the opening, the back surface retaining the panel in a first direction; and at least a bracket removably attached to the frame on the exterior of the vehicle and retaining the panel in a second direction opposite the first direction, wherein the bracket is detachable from the frame by an occupant inside the vehicle for removal of the panel to the exterior of the vehicle in the second direction.

23 Claims, 33 Drawing Sheets

| U.S. PATENT DOCUMENTS | | | | FOREIGN PATENT DOCUMENTS | | |
|---|---|---|---|---|---|---|
| 5,857,730 | A | 1/1999 | Korpi et al. | DE | 20 2005 000 199 U1 | 5/2006 |
| 5,941,022 | A | 8/1999 | Schmuck | DE | 10 2007 021 624 A1 | 11/2008 |
| 6,000,746 | A | 12/1999 | Ito | EP | 1 710 105 A2 | 10/2006 |
| 6,027,073 | A | 2/2000 | Gratien Ferrier | EP | 1 916 496 A1 | 4/2008 |
| 6,308,918 | B1 | 10/2001 | Ferrier | GB | 333062 | 8/1930 |
| 6,340,202 | B1 | 1/2002 | Stanton et al. | JP | 57-155119 | 9/1982 |
| 6,364,397 | B1 | 4/2002 | Bordeaux et al. | JP | 09-013777 | 1/1997 |
| 6,364,404 | B1 | 4/2002 | De Paoli | JP | 09-013811 | 1/1997 |
| 6,427,383 | B1 | 8/2002 | Brooks et al. | JP | 09-013812 | 1/1997 |
| 6,460,917 | B2 | 10/2002 | De Paoli | JP | 09-024732 | 1/1997 |
| 6,540,288 | B1 | 4/2003 | Tobin | JP | 09-030416 | 2/1997 |
| 6,550,848 | B2 | 4/2003 | Kleemann | JP | 09-109671 | 4/1997 |
| 6,688,659 | B2 | 2/2004 | Kobrehel | JP | 09-263124 | 10/1997 |
| 6,726,271 | B2 | 4/2004 | Stanton et al. | JP | 10-217764 | 8/1998 |
| 6,823,632 | B2 | 11/2004 | Yun | JP | 11-023193 | 1/1999 |
| 6,932,395 | B1 | 8/2005 | du Bois | JP | 2001-508731 | 7/2001 |
| 7,232,181 | B2 | 6/2007 | Schmucker | JP | 2002-067682 | 3/2002 |
| 2001/0032422 | A1 | 10/2001 | Farrar | JP | 2002-067683 | 3/2002 |
| 2005/0161972 | A1 | 7/2005 | Farrar et al. | JP | 2002-070439 | 3/2002 |
| 2005/0200163 | A1 | 9/2005 | Arnold, Jr. et al. | RU | 2 253 577 C1 | 6/2005 |
| 2006/0175866 | A1 | 8/2006 | Dankert et al. | WO | WO 99/07600 | 2/1999 |
| 2007/0199245 | A1 | 8/2007 | Peters | WO | WO 2008/118151 A2 | 10/2008 |
| 2007/0283626 | A1 | 12/2007 | Neto | WO | WO 2008/118151 A3 | 10/2008 |

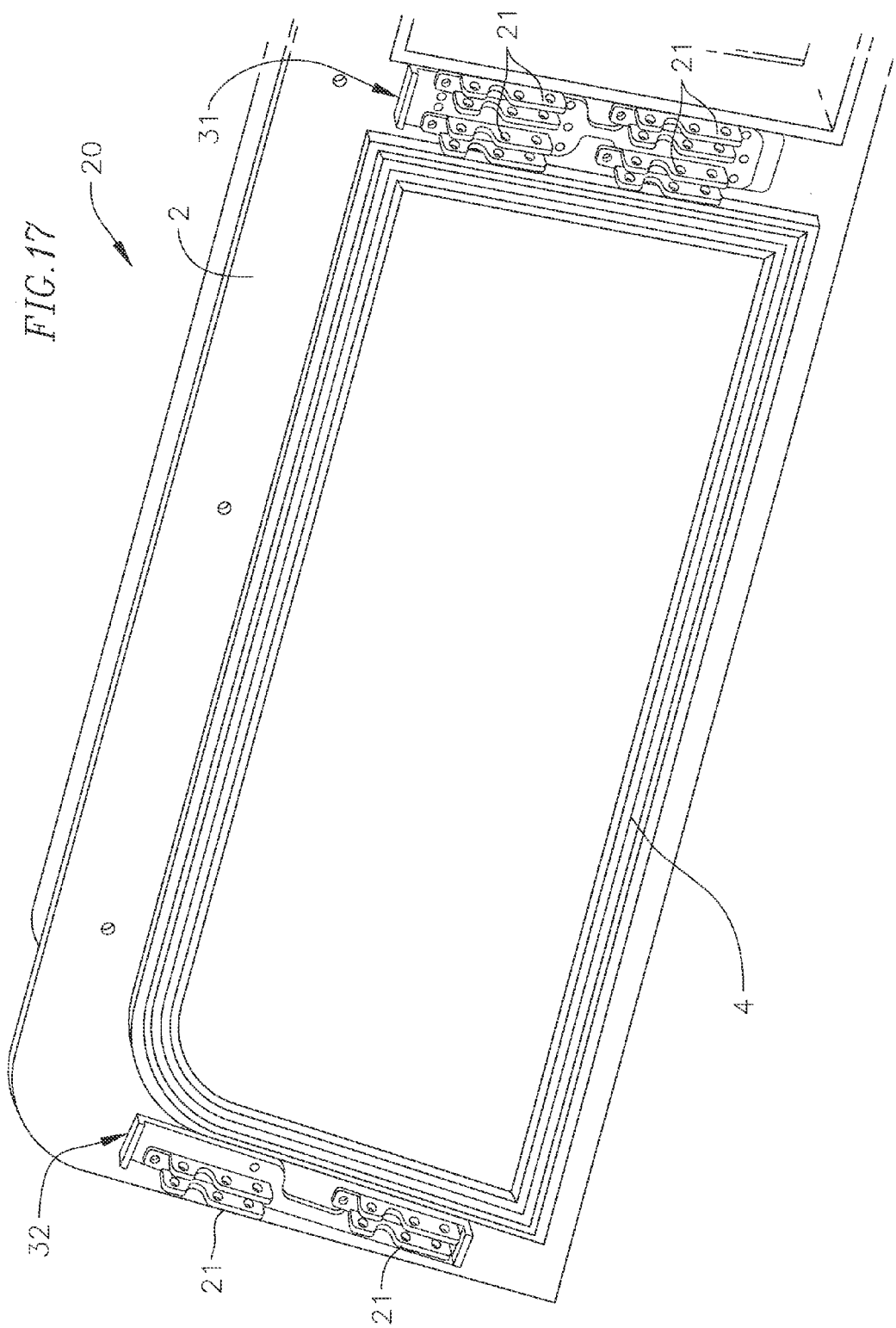

VEHICLE EMERGENCY EGRESS SYSTEM

CROSS-REFERENCE TO RELATED APPLICATION

This application claims priority to and the benefit of U.S. Provisional Patent Application No. 61/251,184, filed on Oct. 13, 2009, the entire content of which is incorporated herein by reference.

FIELD

Aspects of embodiments of the present invention relate to vehicle egress systems, and more particularly to a vehicle emergency egress system configured to allow an occupant to easily and rapidly exit from a vehicle.

BACKGROUND

Conventional window frames of armored military vehicles are typically immovable or exceedingly difficult to remove in a timely fashion to provide soldiers, or other occupants, an option for egress during emergency situations. Typical vehicle emergency egress systems are cumbersome, requiring a multi-layered stack up of metallic frames and/or complex latching mechanisms, resulting in a reduced surface area of transparent armor. This resulting reduction in transparent armor reduces soldier visibility and the dimensions of the egress passageway. Moreover, to operate many conventional emergency egress systems require the simultaneous or sequential actuation of multiple independent, manually-operated release mechanisms. Such a system requires a soldier, or other occupant, during an emergency event, to retain the physical ability to provide enough force to move, lift, or shift the weight of a heavy transparent armor window. Further, many complex conventional systems inherently have difficulties for vehicle integration and use in the field.

SUMMARY

Embodiments of a vehicle emergency egress system according to the present invention are configured to overcome shortcomings of the prior art discussed above. Aspects of embodiments of the present invention are directed to a vehicle emergency egress system including a single armor frame configured for quick and simple attachment to an existing vehicle window frame, and "frameless" transparent armor configured to be removably supported in the armor frame. The frameless design of the transparent armor facilitates a method of releasing (mechanically or non-mechanically) the transparent armor from the armor frame to provide a passage for occupant egress. A further aspect of embodiments of the present invention is a single add-on monolithic armor frame with an integrated frame to receive transparent armor and integrated onto a vehicle requiring minimal, if any, modification to the original equipment manufacturer ("OEM") structure of the vehicle. Advantages of the present invention include, without limitation, a system having a one-piece frame adapted for simple installation, including retrofit, and configured to quickly provide a passage for emergency egress without the need for an occupant to manually manipulate independent mechanisms simultaneously or sequentially.

According to one embodiment, an emergency egress system for providing an opening for egress from a vehicle includes a frame configured to be directly attached to the vehicle, the frame having a cavity formed therein and defined on a first side by a back surface facing an exterior of the vehicle, the back surface having an opening formed therethrough; a panel removably received in the cavity for covering the opening, the back surface retaining the panel in a first direction; and at least a bracket removably attached to the frame on the exterior of the vehicle and retaining the panel in a second direction opposite the first direction, wherein the bracket is detachable from the frame by an occupant inside the vehicle for removal of the panel to the exterior of the vehicle in the second direction.

In one embodiment, the frame is a unitary structure, and the panel or a gasket contacting the panel is adjacent at least one edge surface of the frame extending from the back surface and defining at least one second side of the cavity. In one embodiment, the panel provides at least one of ballistic protection or environmental sealing to an interior of the vehicle when covering the opening.

In one embodiment, the bracket is removably attached to the frame via at least one pyrotechnically shearable bolt, and the panel is removable to uncover the opening when the at least one bolt is sheared.

In one embodiment, the at least one bracket abuts an exterior surface of the panel for retaining the panel in the cavity and covering the opening.

In one embodiment, the at least a bracket includes a first bracket located at an inboard region of the frame and a second bracket located at an outboard region of the frame relative to the first bracket. The first bracket may include a flange abutting an exterior surface of the panel near a first edge, and the second bracket may include a flange abutting the exterior surface of the panel near a second edge, the flanges of the first and second brackets retaining the panel in the cavity and covering the opening. The emergency egress system may further include another panel removably received in another cavity of the frame for covering another opening, and the first bracket may further include another flange abutting an exterior surface of the another panel near an edge of the another panel and retaining the another panel in the another cavity and covering the another opening.

In one embodiment, the first bracket and the second bracket do not surround a periphery of the panel. The panel may include a transparent panel, such as a transparent windshield or window. Also, the panel may include an armor-grade windshield or window. Further, the frame may be monolithic.

In one embodiment, an emergency egress system includes a latch coupled to the frame, and the bracket is removably attached to the frame via the latch. The at least a bracket may include a rod engageable with the latch for removably attaching the bracket to the frame.

In one embodiment, an emergency egress system includes a restraint device including: a first mounting portion mounted to one of the frame or the bracket and having a first cavity and a second cavity formed therein, the second cavity intersecting the first cavity; a second mounting portion mounted to the other of the frame or the bracket and removably received in the first cavity of the first mounting portion; and a pin in the second cavity of the first mounting portion, the pin being movable between an engaging position in which the pin engages the second mounting portion for maintaining the bracket coupled to the frame and retaining the panel covering the opening and a releasing position in which the pin does not engage the second mounting portion and the bracket is removable from the frame for removing the panel to uncover the opening. In one embodiment, the second mounting portion has a groove formed therein, the pin includes a first portion having a first diameter and a second portion having a second diameter smaller than the first diameter, the first portion is aligned with and extends into the groove when the pin is in the engaging position, and the second portion is aligned with the groove and the pin does not extend into the groove when the pin is in the releasing position. The restraint device may further include a cable extending through the first mounting portion, the cable being displaceable relative to the second mounting portion for moving the pin between the engaging position and the releasing position. In one embodiment, the first mounting portion is mounted to the frame, and the second mounting portion is mounted to the bracket.

In one embodiment, an emergency egress system further includes another first mounting portion mounted to one of the frame or another bracket of the at least a bracket; another second mounting portion mounted to the other of the frame or the another bracket of the at least a bracket; and another pin being movable for removing the panel to uncover the opening, and the cable extends through the another first mounting portion and is displaceable relative to the another second mounting portion for moving the another pin.

In one embodiment, an emergency egress system includes a restraint device including: a first restraint portion having a first cavity and a second cavity formed therein, the second cavity intersecting the first cavity; a second restraint portion mounted to the frame and removably received in the first cavity of the first restraint portion; and a pin in the second cavity of the first restraint portion, the pin being movable between an engaging position in which the pin engages the second restraint portion for maintaining the bracket coupled to the frame and retaining the panel covering the opening and a releasing position in which the pin does not engage the second restraint portion and the bracket is removable from the frame for removing the panel to uncover the opening.

In one embodiment, the at least a bracket includes a first restraint portion having a first cavity and a second cavity formed therein, the second cavity intersecting the first cavity, and the emergency egress system further includes: a second restraint portion mounted to the frame and removably received in the first cavity of the first restraint portion; and a pin in the second cavity of the first restraint portion, the pin being movable between an engaging position in which the pin engages the second restraint portion for maintaining the bracket coupled to the frame and retaining the panel covering the opening and a releasing position in which the pin does not engage the second restraint portion and the bracket is removable from the frame for removing the panel to uncover the opening.

The bracket may be an annular member. In one embodiment, the emergency egress system further includes a gasket surrounding a periphery of the panel for providing an environmental seal between the panel and the frame.

According to another embodiment, a vehicle includes a window frame; and an emergency egress system including a monolithic frame directly attached to the window frame, the monolithic frame having a cavity formed therein and defined on a first side by a back surface facing an exterior of the vehicle, the back surface having an opening formed therethrough; a panel removably received in the cavity for covering the opening, the back surface retaining the panel in a first direction; and at least a bracket removably attached to the monolithic frame on the exterior of the vehicle and retaining the panel in a second direction opposite the first direction, wherein the bracket is detachable from the monolithic frame by an occupant inside the vehicle for removal of the panel to the exterior of the vehicle in the second direction.

Other features and advantages of embodiments of the present invention will become apparent from the following detailed description, taken in conjunction with the accompanying drawings which illustrate, by way of examples, the features of embodiments of the present invention.

BRIEF DESCRIPTION OF THE DRAWINGS

FIG. 17 is a front perspective view showing latches on an armor frame of the vehicle emergency egress system of FIG. 13.

DETAILED DESCRIPTION

Figure 1:
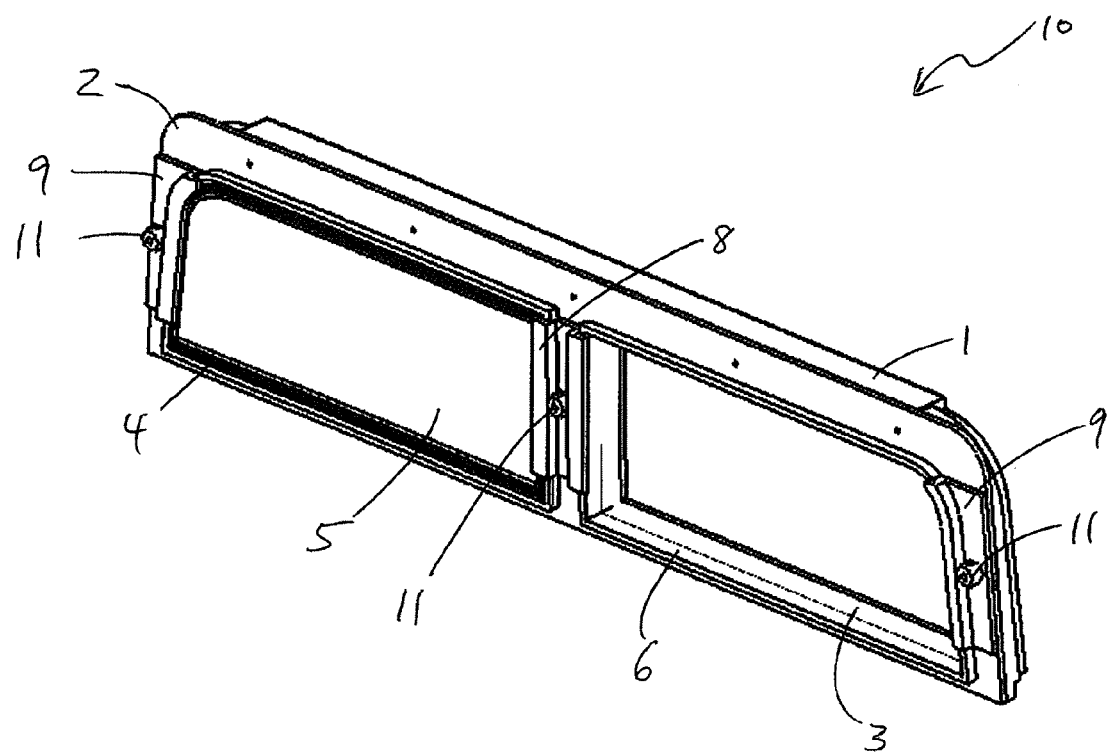
FIG. 1 is a front perspective view of a vehicle emergency egress system according to an embodiment of the present invention.
Figure 2:
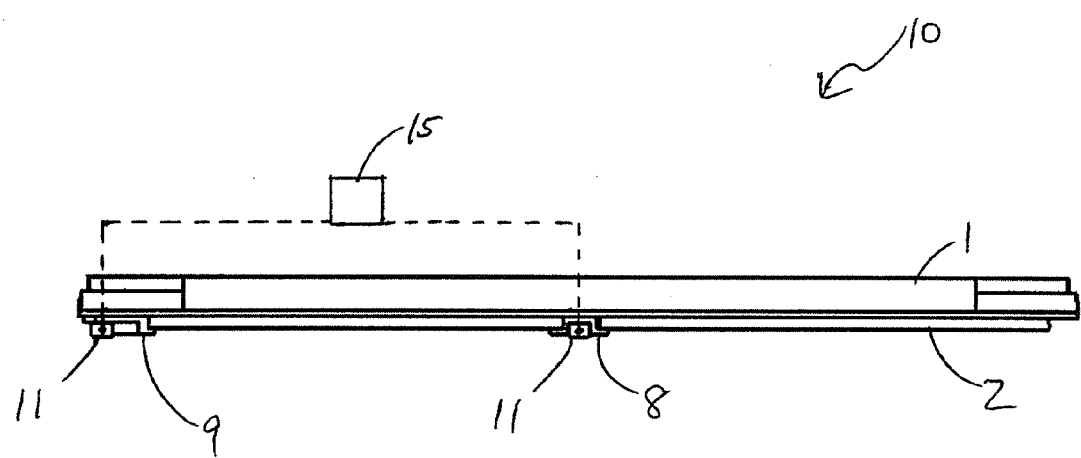
FIG. 2 is a top view of the vehicle emergency egress system of FIG. 1.
Figure 3:
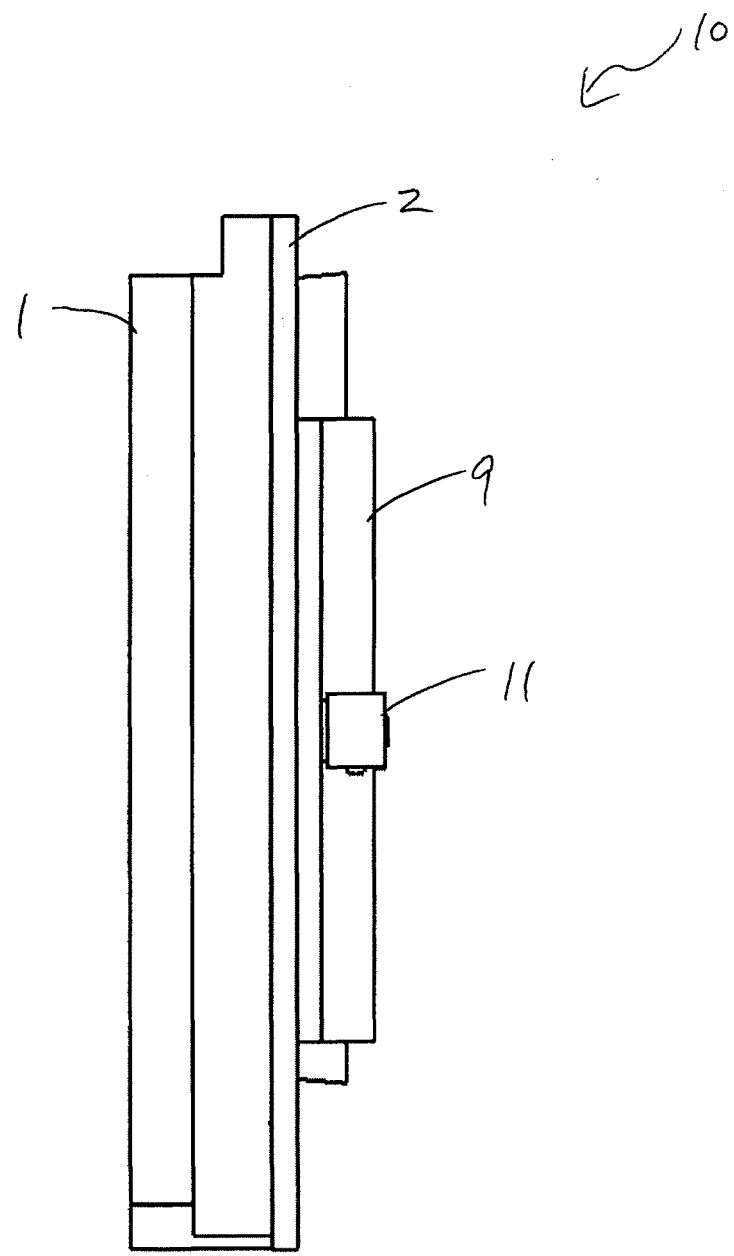
FIG. 3 is a side view of the vehicle emergency egress system of FIG. 1.

In the following detailed description, certain embodiments of the present invention are shown and described, by way of exemplary embodiments. As those skilled in the art would recognize, the described exemplary embodiments may be modified in various ways without departing from the spirit and scope of the present invention. Accordingly, the drawings and description are to be regarded as illustrative in nature, rather than restrictive.

A vehicle emergency egress system, according to one exemplary embodiment of the present invention, is described and shown herein in connection with an armored vehicle and a transparent armor windshield thereof, specifically the windshield of an AM General HMMWV ("HUMVEE®") vehicle. HUMVEE® is a registered trademark of AM General Corporation. However, embodiments of the present invention are not limited thereto and may be utilized in other applications, such as other transparent armor panels (e.g., side or rear transparent armor panels) of an armored vehicle, transparent windshields or windows of other passenger vehicles, or a non-transparent armor or non-armor panel (e.g., a roof panel) removable for emergency egress from any vehicle or structure, any of which may have any suitable size and shape for providing an emergency egress passageway. That is, although referred to later herein as "transparent minor" windows or panels, the invention is not limited thereto and may be applied to any armor or non-armor grade window or panel on any surface of any vehicle or structure. Further, embodiments of a vehicle emergency egress system according to the present invention may be modified for any desired vehicle platform for providing emergency egress, as well as any level of armament decided by an OEM. Additionally, as described and shown herein (e.g., in FIGS. 4 and 5), references to the "front" of the vehicle emergency egress system or components thereof refer to a side proximate or facing the outside of the vehicle. For example, in FIG. 4, a vehicle emergency egress system is shown from a viewpoint outside the vehicle and, as such, the "front" of the vehicle emergency system is primarily shown. By contrast, references to the "rear" or "back" of the vehicle emergency egress system or components thereof refer to a side proximate or facing the inside of the vehicle. For example, in FIG. 5, a vehicle emergency egress system is shown from a viewpoint inside the vehicle and, as such, the "rear" of the vehicle emergency system is primarily shown. Therefore, as used herein, the "front" and "rear" of the vehicle emergency egress system or components thereof may or may not coincide with the respective front and rear of the vehicle, depending on the location on the vehicle of the vehicle emergency egress system.

With reference to FIGS. 1-5, a vehicle emergency egress system 10 according to an exemplary embodiment of the present invention is shown integrated onto a standard HUMVEE® structural windshield frame 1 and includes an armor frame 2 stacked onto and fixed at existing bolt locations of the windshield frame 1, and one or more transparent armor panels 5 supported by the armor frame 2. The transparent armor panels 5 may be configured as two panels of a windshield, a single windshield panel, one or more other windows, or one or more other panels or plates of armor material or non-armor material which may or may not be transparent. In one exemplary embodiment of the present invention, the armor frame 2 consists of an integrated, one-piece (e.g., monolithic) frame. As such, the armor frame 2 may be quickly and easily installed or retrofitted in the field to an existing vehicle (e.g., a HUMVEE®, etc.). Further, in an exemplary embodiment of the present invention, minimal or no modifications to the windshield frame 1 are required. That is, unlike conventional systems which require partial disassembly of the HUMVEE® roof panel for installing the vehicle emergency egress system, embodiments of the vehicle emergency egress system according to the present invention are quickly and easily installed or retrofitted with minimal or no modifications to the vehicle. The armor frame 2, in one embodiment, is formed of armor-grade steel defined by a military specification meeting the OEM's ballistic criteria. However, in other embodiments, the armor frame 2 may be formed of a metal, a metal/composite, a ceramic/metal/composite hybrid system, or any other suitable material. Moreover, the construction and materials of the armor frame 2 may depend on the desired application and/or ballistic criteria.

Figure 6:
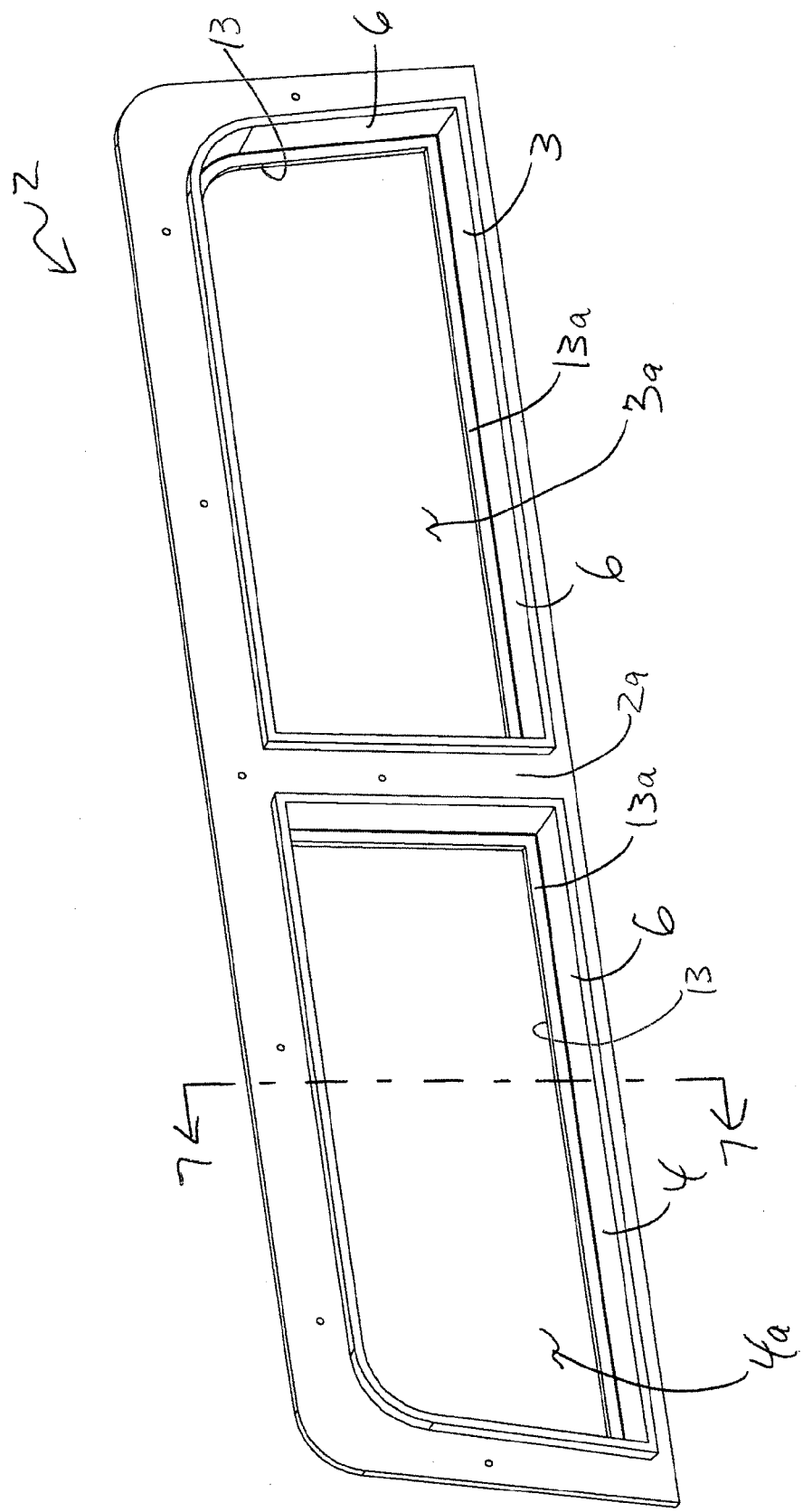
FIG. 6 is a front perspective view of an armor frame of the vehicle emergency egress system of FIG. 1.
Figure 7:
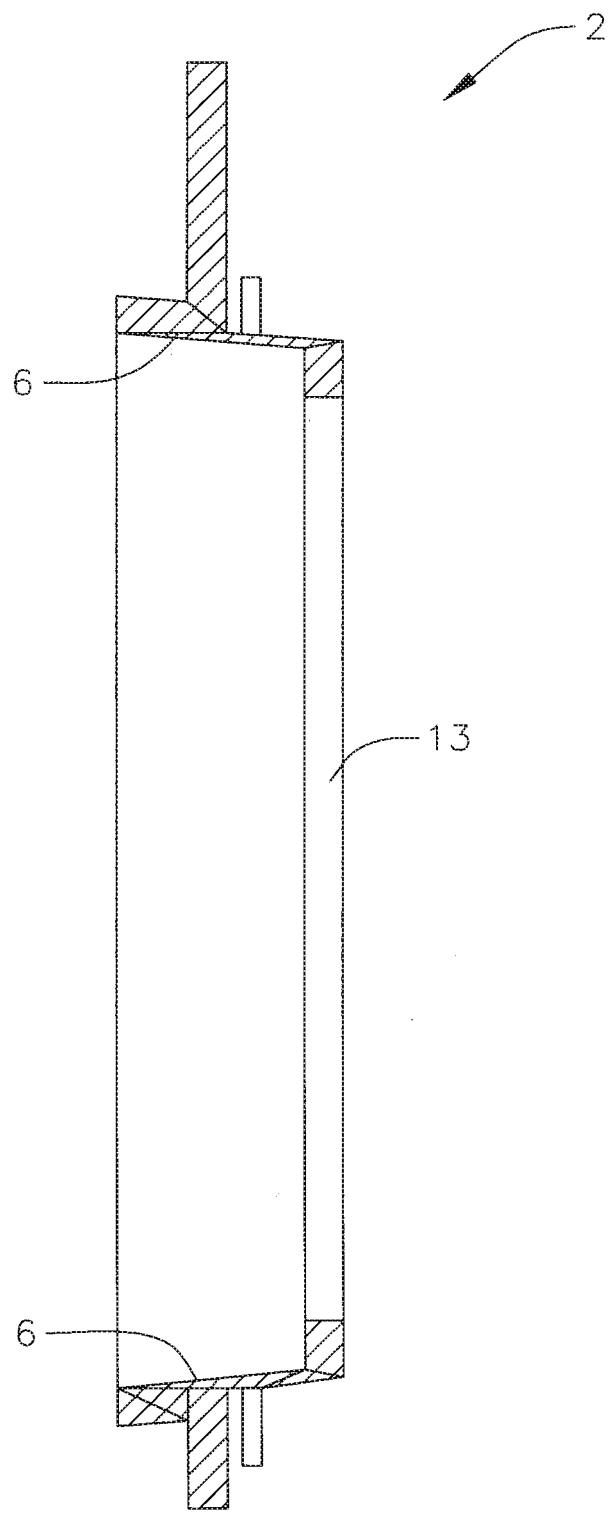
FIG. 7 is a sectional view of the armor frame of FIG. 6 along the line 7-7.
Figure 8:
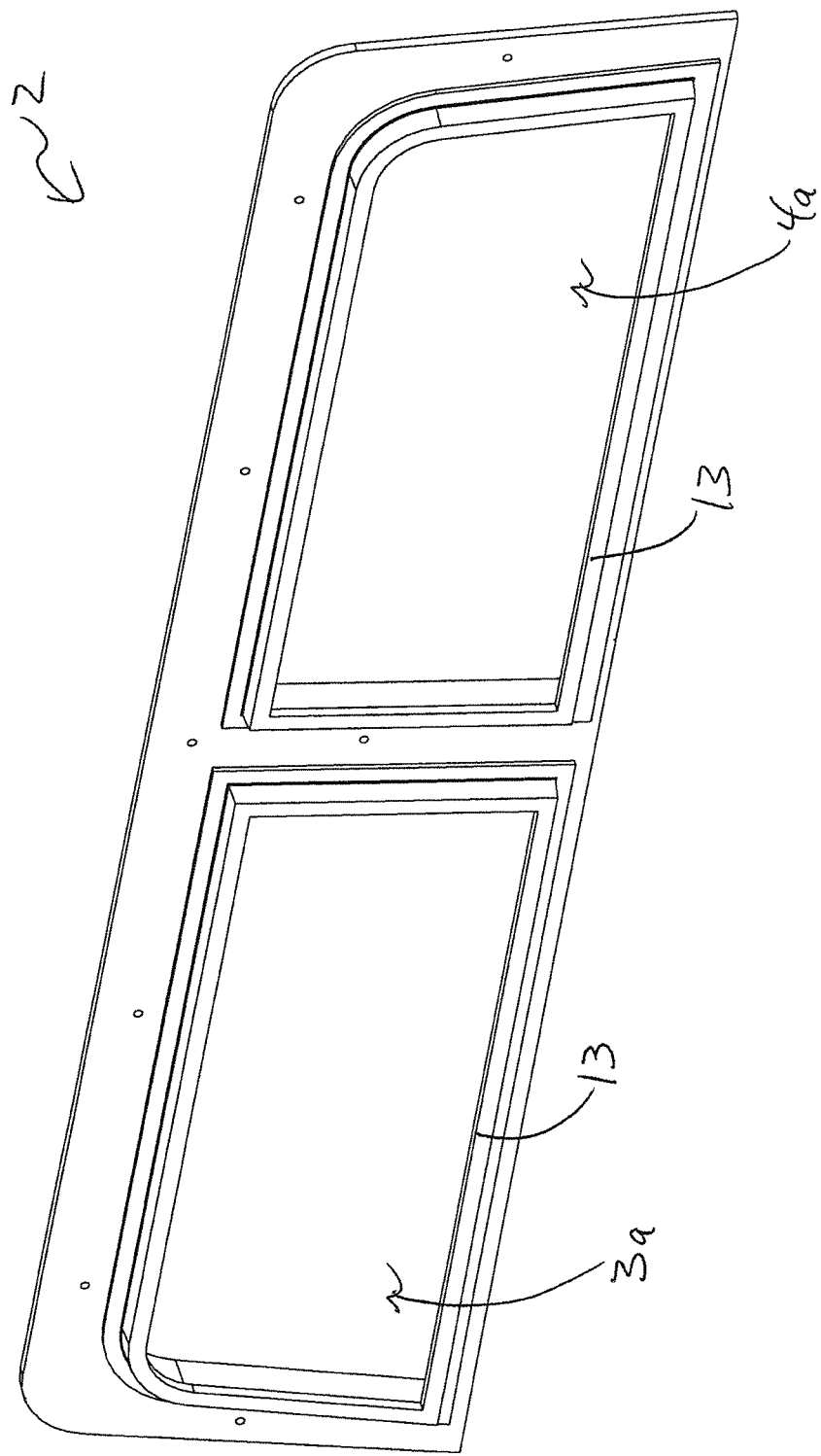
FIG. 8 is a rear perspective view of the armor frame of FIG. 6.

With reference to FIGS. 6 and 8, the armor frame 2, in one exemplary embodiment, has cavities 3 and 4 on the driver and passenger sides, respectively, that are configured to each receive one of the transparent minor panels 5 therein. For example, the cavities 3, 4 may be configured to receive the transparent armor panels 5 directly therein without requiring an additional window frame holding the transparent armor panels 5 and stacked on the armor frame, as seen in conventional systems. Alternatively, the armor frame 2 may have a single cavity or more than two cavities for receiving a corresponding number of transparent armor panels 5. An opening 3a, 4a is defined at the rear of each of the respective cavities 3, 4. Each of the cavities 3, 4, in one exemplary embodiment, is defined on a first side by a front surface 13a of a backstop 13 at the rear of the cavity 3, 4 and on perimeter sides by one or more edge surfaces 6 adjacent the front surface 13a. Each of the openings 3a, 4a is bounded by the corresponding backstop 13. Further, in one exemplary embodiment, one or more of the edge surfaces 6 has a contour for reducing or preventing binding of the transparent armor panel 5 as it is rotated or pivoted during disengagement from the cavity 3, 4. For example, in one exemplary embodiment, as shown in FIGS. 6 and 7, the lower edge surface 6 is sloped downward toward the exterior of the vehicle to reduce or prevent binding and thereby facilitate pushing the transparent armor panel 5 out of the cavity 3, 4 for egress. Also, as shown in FIG. 7, the upper edge surface 6 may be sloped upward toward the exterior of the vehicle, and similarly, any or all other edges (e.g., one or both of the side edge surfaces 6) may be sloped, depending on a particular vehicle application, for reducing or preventing binding while the transparent armor panel 5 is pushed out of the cavity 3, 4. In one embodiment of the invention, the lower and upper edge surfaces 6 are sloped at about 10 degrees. The backstop 13 is recessed from a front face 2a of the armor frame 2 and includes the front surface 13a against which the transparent armor panel 5 seats when the transparent armor panel 5 is retained in the cavity 3, 4. In the embodiment shown in the drawings, the armor frame 2 has two openings (i.e. an opening on the driver side and an opening on the passenger side) for providing egress passageways.

However, in alternative embodiments, the vehicle emergency egress system may include any other suitable number of openings for egress.

The transparent armor panels 5, in one exemplary embodiment, are constructed of a glass laminate configured to meet a required ballistic specification, such as an equivalent ballistic specification to that of the armor frame 2. In other embodiments, the transparent armor panels 5 may be formed of any other material or combination of materials, e.g., a glass/plastic laminate, suitable for a desired application, and further, in some embodiments, may not be formed of an armor-grade material (despite the nomenclature used herein), but rather, may be formed of a non-armor-grade glass, acrylic, polycarbonate, or other transparent material. In one embodiment, the transparent armor panels 5 may be configured to be heatable, such as for providing a de-icing or de-fogging capability. Also, in one embodiment, the transparent armor panels 5 may be configured to be compatible with night-vision goggles. Additionally, in one embodiment, and possibly in combination with being heatable and/or compatible with night-vision goggles, the transparent armor panels 5 may be configured to provide shielding of electromagnetic interference, such as radio frequency interference. Further, as discussed above, in another embodiment, the transparent armor panels 5 may be formed of a material that is not transparent (despite the nomenclature used herein), such as a material suitable for use as a body panel or roof panel of a vehicle.

Figure 4:
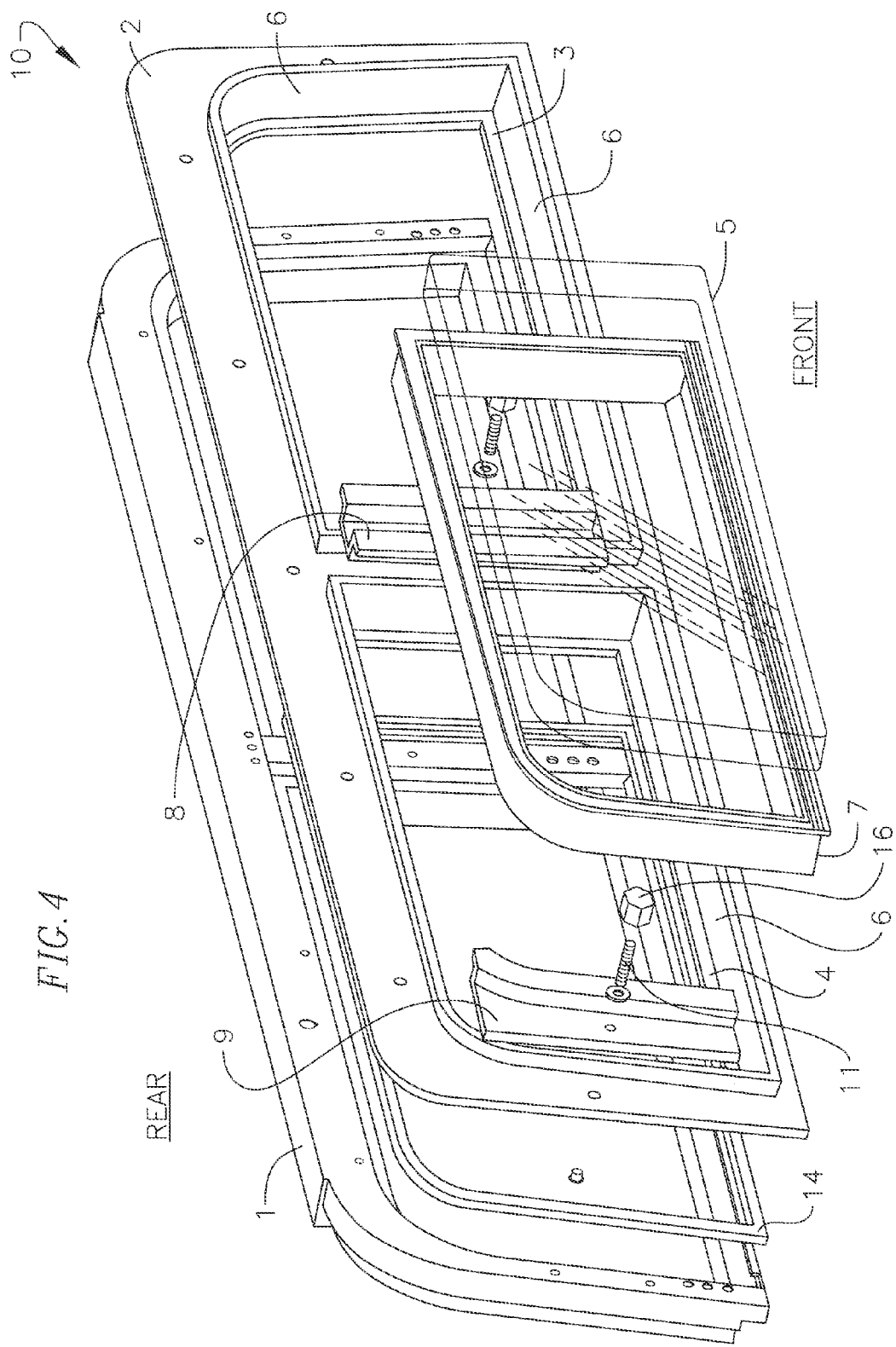
FIG. 4 is an exploded front perspective view of the vehicle emergency egress system of FIG. 1.
Figure 5:
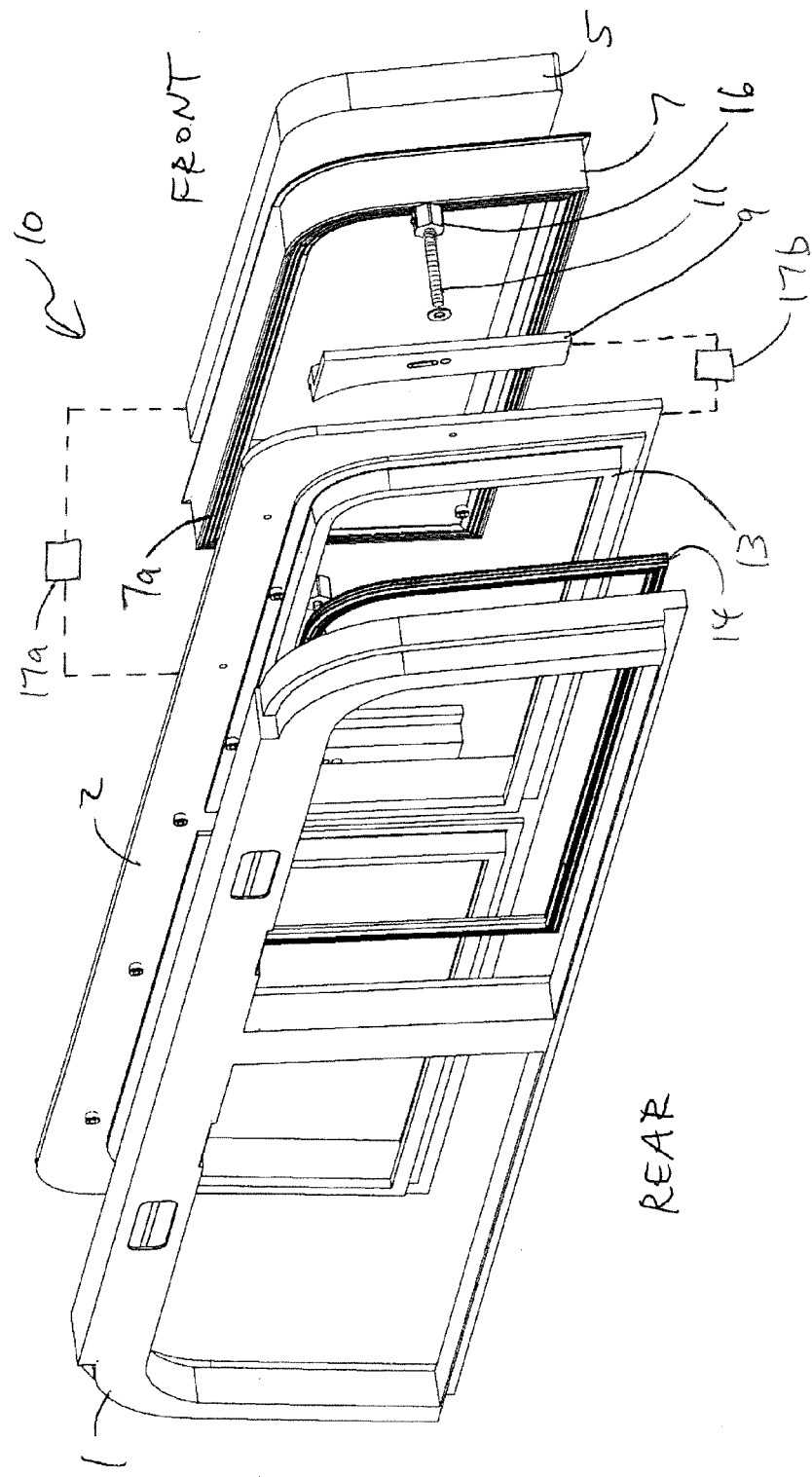
FIG. 5 is an exploded rear perspective view of the vehicle emergency egress system of FIG. 1.

In one exemplary embodiment, as shown in FIGS. 4 and 5, the vehicle emergency egress system 10 includes an extruded C-channel (when viewed in cross-section) gasket 7, or any other suitably configured gasket, around a periphery of the transparent armor panel 5 to provide a seal against environmental factors. In one embodiment, the gasket 7 surrounds a perimeter of the transparent armor panel 5 and has an annular shape having an inner perimeter shape and size complementary to a shape and size of the perimeter of the transparent armor panel 5. The gasket 7 may be made of neoprene or any other suitable material. The gasket 7 and/or the edge surfaces 6 of the cavities 3, 4, in one exemplary embodiment, may be coated with TEFLON®, or any other suitable material for providing a low-friction sliding surface in order to reduce the force required to eject the transparent armor panel 5 from the respective cavity 3, 4 during egress. TEFLON® is a registered trademark of E.I. du Pont de Nemours and Company. The gasket 7, in one exemplary embodiment, does not provide substantial structural support to the transparent armor panel 5, but rather, is configured to provide a moisture and environmental seal between the transparent armor panel 5 and the armor frame 2 and, in one embodiment, includes a contoured rear surface 7a (e.g., a surface having one or more ridges or other features for providing a sealing surface) (see FIG. 5) for abutting the front surface 13a of the backstop 13 and providing an integrated seal therewith.

With further reference to FIGS. 1 and 4, in one exemplary embodiment, each of the transparent armor panels 5 is retained in place in one of the cavities 3, 4 of the armor frame 2 by an inboard retaining bracket 8 and an outboard retaining bracket 9, which may or may not be configured to meet a ballistic specification specified by the OEM. In one embodiment, for example, the retaining brackets 8, 9 are formed of aluminum. However, the retaining brackets 8, 9 may alternatively be formed of any other suitable material. The inboard retaining bracket 8, in one embodiment, retains the inboard edges of both of the driver and passenger side transparent armor panels 5, while the outboard retaining brackets 9 each retain an outboard edge of one of the driver and passenger side transparent armor panels 5. In another embodiment, each of the transparent armor panels 5 is retained by a separate, or dedicated, pair of retaining brackets 8, 9. Also, in another embodiment, rather than the inboard and outboard retaining brackets 8, 9 described above and shown in FIGS. 1 and 4, the vehicle emergency egress system 10 may include retaining brackets at upper and lower edges of the transparent armor panel 5. In yet another embodiment, the vehicle emergency egress system 10 may include retaining brackets at any three edges or sides of the transparent armor panel 5, or on all four sides thereof. In an exemplary embodiment, the vehicle emergency egress system 10 includes bolts 11 for attaching the inboard and outboard retaining brackets 8, 9 to the armor frame 2 while applying proper loading to outer surfaces of the transparent armor panels 5 to constrain them in their respective positions. As used herein, a "bracket" may be a plate, a flanged member, an angle, an annular member, a nut (as described later herein), or any other structure that extends over one or more of the transparent armor panels 5 for retaining the one or more transparent armor panels 5 in the respective cavities 3, 4 of the armor frame 2.

Figure 9:
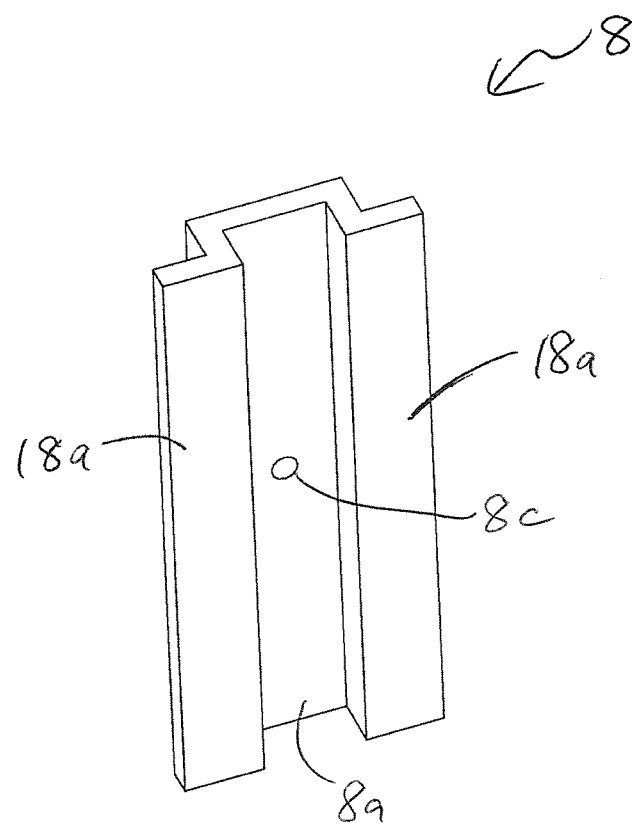
FIG. 9 is a front perspective view of an inboard retaining bracket of the vehicle emergency egress system of FIG. 1.
Figure 10:
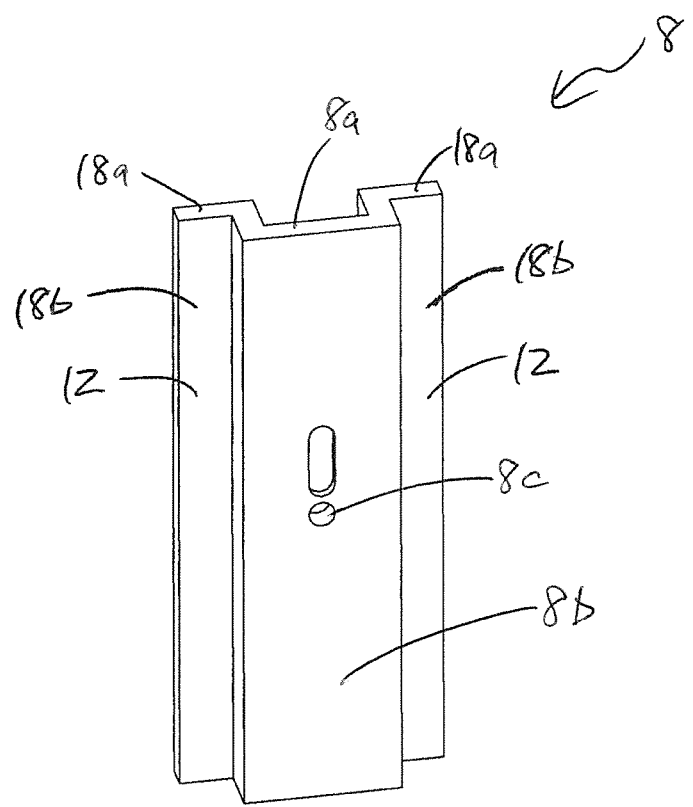
FIG. 10 is a rear perspective view of the inboard retaining bracket of FIG. 9.

With reference to FIGS. 9-12, in one exemplary embodiment, the retaining brackets 8, 9 include base portions 8a, 9a and flanged portions 18a, 19a, respectively, the flanged portions 18a, 19a abutting the outer surfaces of the transparent armor panels 5 for constraining and holding the transparent armor panels 5 in place in the cavities 3, 4. With reference to FIGS. 9 and 10, in one embodiment, the inboard retaining bracket 8 has a base portion 8a including a rear surface 8b for contacting the armor frame 2, and two flanged portions 18a, each of which is configured at a rear surface 18b thereof to clamp against at least a portion of the outer surface (e.g., a peripheral portion near an inboard edge) of a respective one of the transparent armor panels 5 and retain the transparent armor panel 5 in a respective one of the cavities 3, 4. In one embodiment, the flanged portions 18a extend from opposite sides of the base portion 8a and the rear surfaces 18b thereof are offset from the rear surface 8b of the base portion 8a. Further, the inboard retaining bracket 8 has one or more holes 8c for receiving one or more of the bolts 11 therethrough for attachment of the inboard retaining bracket 8 to the armor frame 2.

Figure 11:
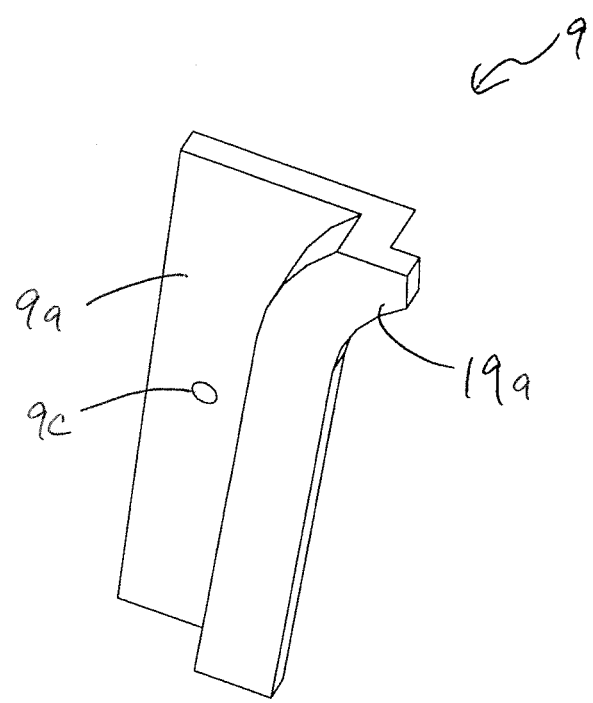
FIG. 11 is a front perspective view of an outboard retaining bracket of the vehicle emergency egress system of FIG. 1.
Figure 12:
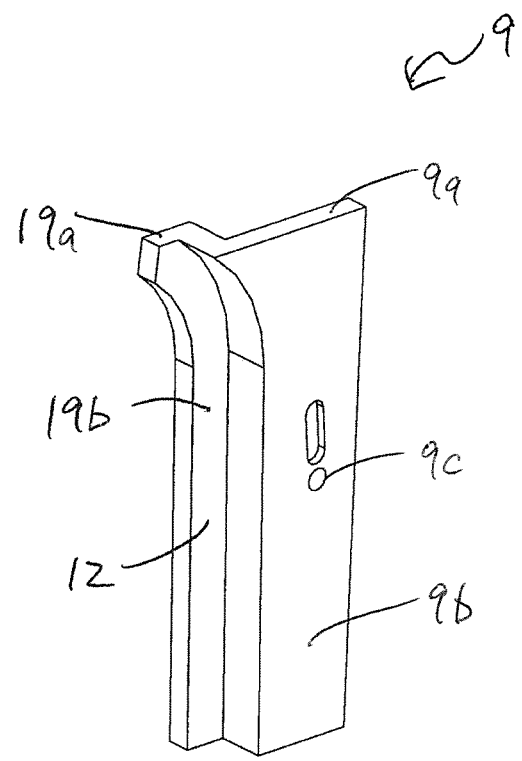
FIG. 12 is a rear perspective view of the outboard retaining bracket of FIG. 11.

With reference to FIGS. 11 and 12, in one embodiment, each of the outboard retaining brackets 9 has a base portion 9a including a rear surface 9b for contacting the armor frame 2, and a flanged portion 19a configured at a rear surface 19b thereof to clamp against at least a portion of the outer surface (e.g., a peripheral portion near an outboard edge) of one of the transparent armor panels 5 and retain the transparent armor panel 5 in a respective one of the cavities 3, 4. In one embodiment, the flanged portion 19a extends from one side of the base portion 9a and the rear surface 19b thereof is offset from the rear surface 9b of the base portion 9a. Further, the outboard retaining bracket 9 has one or more holes 9c for receiving one or more of the bolts 11 therethrough for attachment of the outboard retaining bracket 9 to the armor frame 2.

In one embodiment, one of the bolts 11 is located near a central portion of each of the inboard and outboard retaining brackets 8, 9 for fastening the respective retaining bracket 8, 9 to the armor frame 2 and sandwiching the transparent armor panel 5 between the armor frame 2 and the rear surface 18b, 19b of the flanged portion 18a, 19a of the respective retaining bracket 8, 9, as shown in FIG. 1. Alternatively, the vehicle emergency egress system 10 may include any other suitable number of bolts 11 at any other suitable locations for fastening the retaining brackets 8, 9 to the armor frame 2. Further, in one exemplary embodiment, the rear surfaces 18b, 19b of the flanged portions 18a, 19a are lined with a protective material 12, such as TEFLON® or any other suitable material, configured to reduce or prevent damage to the outer surface of the transparent armor panels 5 and facilitate a snug fit of the transparent armor panels 5 into the cavities 3, 4.

All the bolts 11, in one embodiment, are pyrotechnically shearable (e.g., simultaneously or sequentially) to allow the inboard and outboard retaining brackets 8, 9 to disengage from the minor frame 2, such that the transparent armor panels 5 may be manually pushed, or otherwise expelled, from the cavities 3, 4 to provide passageways for egress. For example, in one embodiment, the emergency egress system 10 includes one or more biasing mechanisms 17a, such as a spring, a piston, a push/pull pin device, a solenoid, or any other suitable biasing mechanism, configured to push the transparent armor panels 5 out from the cavities 3, 4 once the retaining brackets 8, 9 are disengaged from the armor frame 2. For example, the biasing mechanism 17a may include a compression spring located between the armor frame 2 and the transparent armor panel 5 that is biased, or compressed, to push the transparent armor panel 5 outward. As such, a force required to be applied by an occupant of the vehicle to the transparent armor panel 5 for removing the transparent armor panel 5 may be reduced or eliminated. Further, in one embodiment, the emergency egress system 10 may include a biasing mechanism 17b, such as a spring, a piston, a push/pull pin device, a solenoid, or any other suitable biasing mechanism located between the minor frame 2 and the retaining brackets 8, 9 for biasing the retaining brackets 8, 9 away from the armor frame 2. That is, the retaining brackets 8, 9 may be biased (e.g., spring-loaded) to be pushed away from the armor frame 2 when the bolts 11 are sheared. The emergency egress system 10 may include one or both (or neither) of the biasing mechanisms 17a, 17b discussed above.

In one exemplary embodiment, the bolts 11 are pyrotechnically shearable via a chemical reaction which creates an expanded gas and drives a piston, as is well known in the art, to apply a destructive force to the bolts 11. In alternative embodiments, the bolts 11 may be sheared or otherwise disengaged by any other suitable device or method. The vehicle emergency egress system 10, in one exemplary embodiment, includes an activator 15 (see FIG. 2) for providing a charge to initiate a chemical reaction for shearing the bolts 11. The activator 15 may be located at any suitable location, such as an ergonomic location, for operation by an occupant within the vehicle, or alternatively, by a person outside the vehicle. The activator 15, in one embodiment, may include an electric actuator, or may include a metal-encased wire containing a charge cord, for providing a charge to initiate a reaction for shearing the bolts 11. Further, the activator 15 may include a self-contained power system or may be integrated into a power system of the vehicle. In one embodiment, heads 16 (see FIGS. 4 and 5) of the bolts 11 may be sheared from respective shaft portions of the bolts 11. Alternatively, the bolts 11 may be sheared at any suitable location along the shaft portion.

The backstop 13, as discussed above with respect to one exemplary embodiment, includes the front surface 13a (see FIG. 6) that defines a rear portion of one of the cavities 3, 4. The backstop 13 is configured to allow the transparent armor panel 5 with the gasket 7 to seat into position against the backstop 13, while also providing additional ballistic protection, as well as protection against the environment, at the interface of the transparent armor panel 5 and the armor frame 2. For example, the backstop 13 may provide ballistic protection to occupants of the vehicle against a projectile striking the interface of the transparent armor panel 5 and the edge of the cavity 3, 4 of the armor frame 2. Further, in one embodiment, a gasket 14 is disposed around the backstop 13 on a rear side of the armor frame 2, as shown in FIGS. 4 and 5, for providing an environmental seal between the backstop 13 (and the armor frame 2 generally) and the windshield frame 1. The gasket 14 may be made of neoprene or any other suitable material. In one embodiment, the gasket 14 has an annular shape substantially corresponding to a shape of the backstop 13, and an inner perimeter of the gasket 14 is larger than an outer perimeter of the backstop 13 such that the gasket 14 surrounds the backstop 13.

As discussed above, embodiments of a vehicle emergency egress system according to the present invention are configured to provide a passageway for emergency egress without the need for the operator/occupant to manipulate multiple mechanisms simultaneously or sequentially. Embodiments of the vehicle emergency egress system of the present invention are configured such that the operator only needs to engage the activator and apply a small amount of force, if necessary, to release the transparent armor panel 5 from the armor frame 2. Additionally, embodiments of the egress system according to the present invention eliminate the need for a separate window frame for retaining the transparent armor, as required in conventional systems. That is, instead of requiring an additional frame stacked up against the armor frame for supporting the transparent armor, the armor frame 2 itself supports the transparent armor panels 5 in the cavities 3, 4 thereof. As such, embodiments of the vehicle emergency egress system according to the present invention increase the surface area of the transparent armor panels, and therefore provide greater viewing area and a larger unobstructed egress passageway as compared to conventional systems. Additionally, embodiments of the vehicle emergency egress system according to the present invention are universal in that the system is applicable to any vehicle platform with slight modification and requires fewer parts, thereby decreasing cost and facilitating production, installation, and in-field retrofitting. Further, by not requiring a separate window frame for retaining the transparent armor panels or multiple separate release mechanisms, embodiments of the present invention have reduced weight, and also use less of the interior space available in the vehicle.

In alternative exemplary embodiments of a vehicle emergency egress system according to the present invention, devices and methods for releasing the inboard and outboard restraints of the transparent armor panels may vary with respect to the above-described method of bolt disengagement. That is, in alternative embodiments of the present invention, a vehicle emergency egress system may include any other suitable device or method for disengaging the transparent armor panels, such as spring-loaded or quick-release bolts, or a pyrotechnically actuated or shearable component other than a bolt. In another alternative embodiment, latches may be integrated into the inboard and outboard restraint and activated or released by a pull cable. Additionally, embodiments of a vehicle emergency egress system of the present invention may be combined with or include further devices for facilitating egress. For example, an embodiment of a vehicle emergency egress system of the present invention may include or be combined with a device or mechanism for expelling a windshield wiper or other vehicle component for facilitating removal of the transparent armor panel and facilitating egress.

With reference to FIGS. 13-16, a vehicle emergency egress system 20 according to another exemplary embodiment of the present invention includes latches 21 (see FIGS. 15 and 16), rather than pyrotechnically shearable bolts, for holding inboard and outboard retaining brackets 22, 23 in place for retaining the transparent armor panels 5 in the cavities 3, 4 of the armor frame 2. The retaining brackets 22, 23 of the vehicle emergency egress system 20 are configured to retain the transparent armor panels 5 in the cavities 3, 4 of the armor frame 2 and are in lieu of the retaining brackets 8, 9 of the vehicle emergency egress system 10. As discussed above with respect to the retaining brackets 8, 9, the vehicle emergency egress system 20, in other embodiments, may include retaining brackets at upper and lower edges of the transparent armor panel 5, or at three or four sides thereof.

Figure 13:
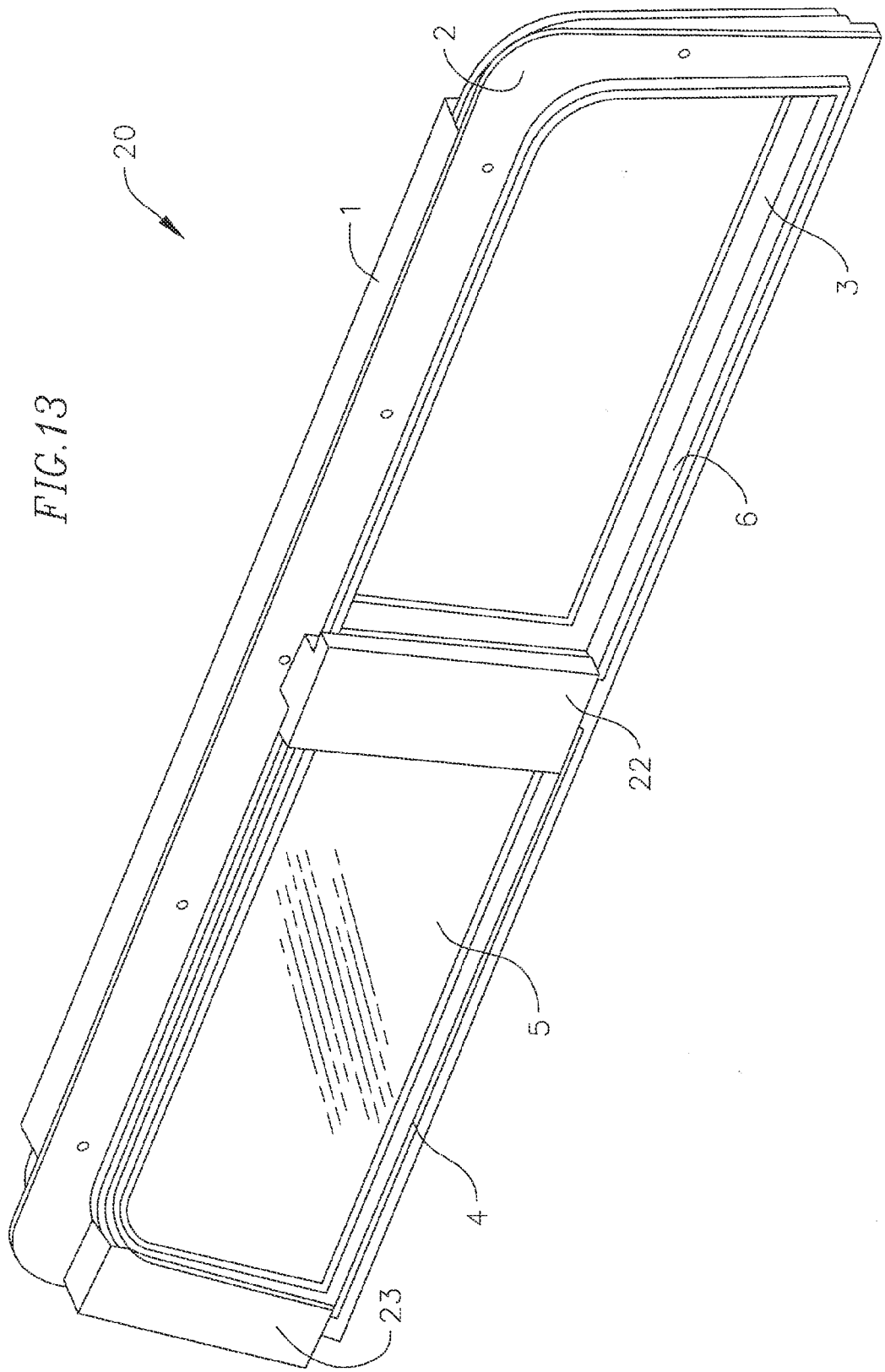
FIG. 13 is a front perspective view of a vehicle emergency egress system according to another embodiment of the present invention.
Figure 14:
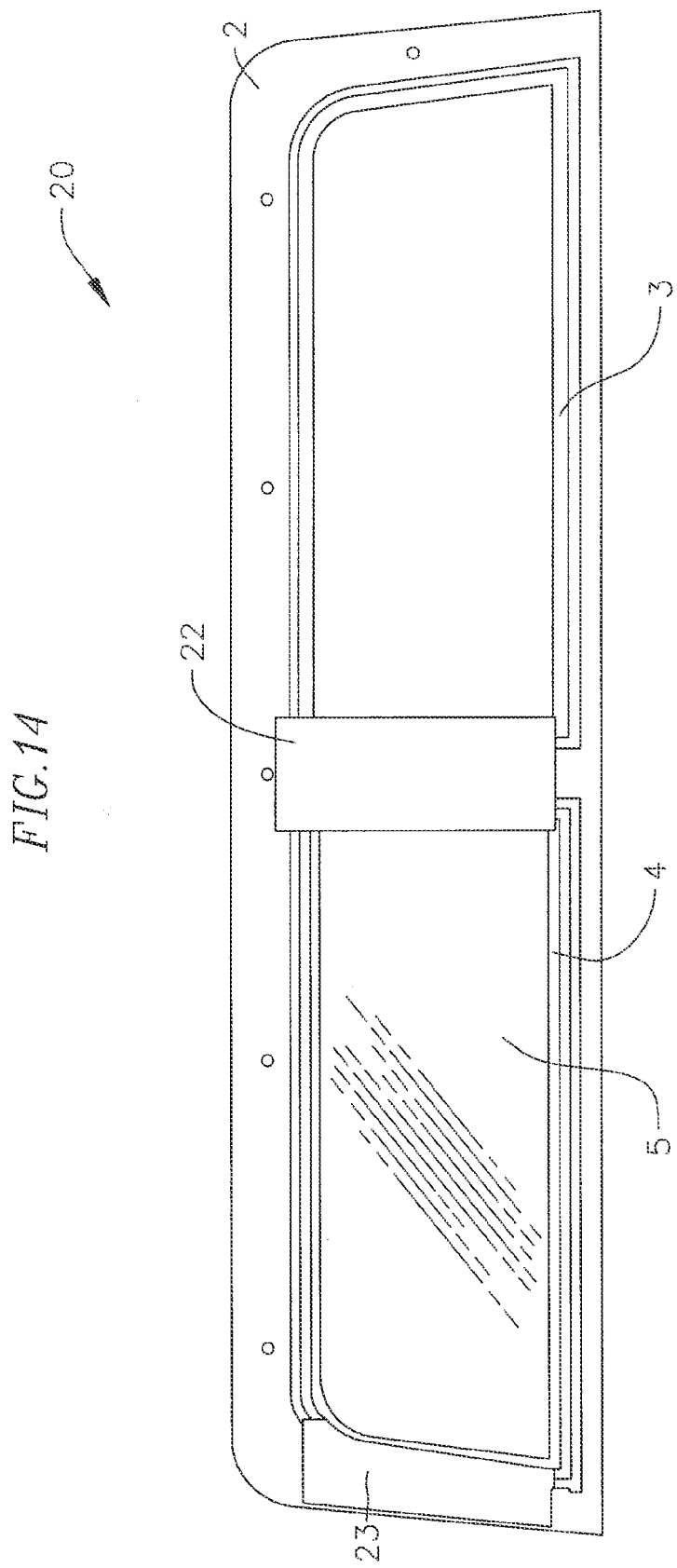
FIG. 14 is a front view of the vehicle emergency egress system of FIG. 13.
Figure 15:
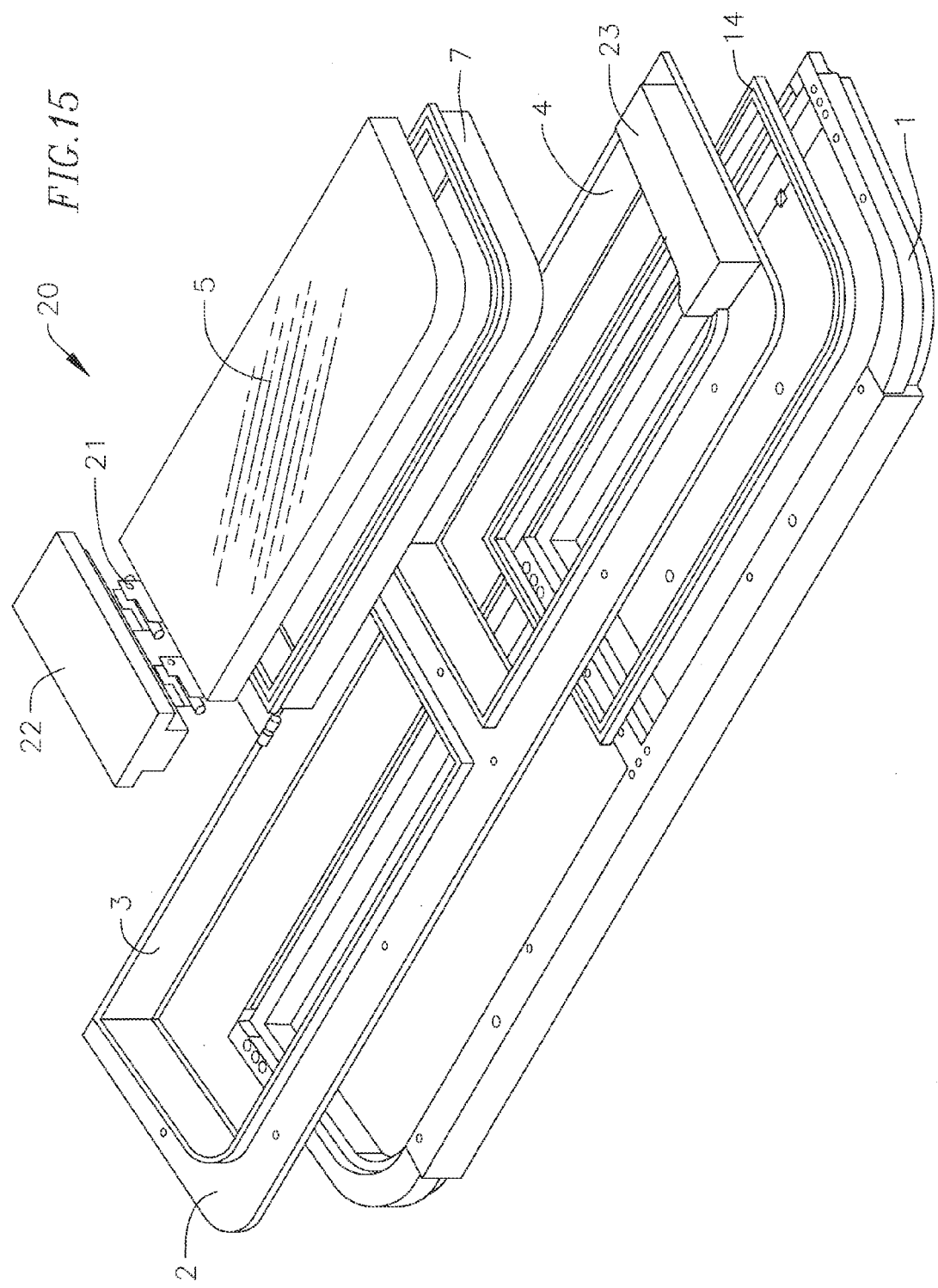
FIG. 15 is a partially exploded perspective view of the vehicle emergency egress system of FIG. 13.
Figure 16:
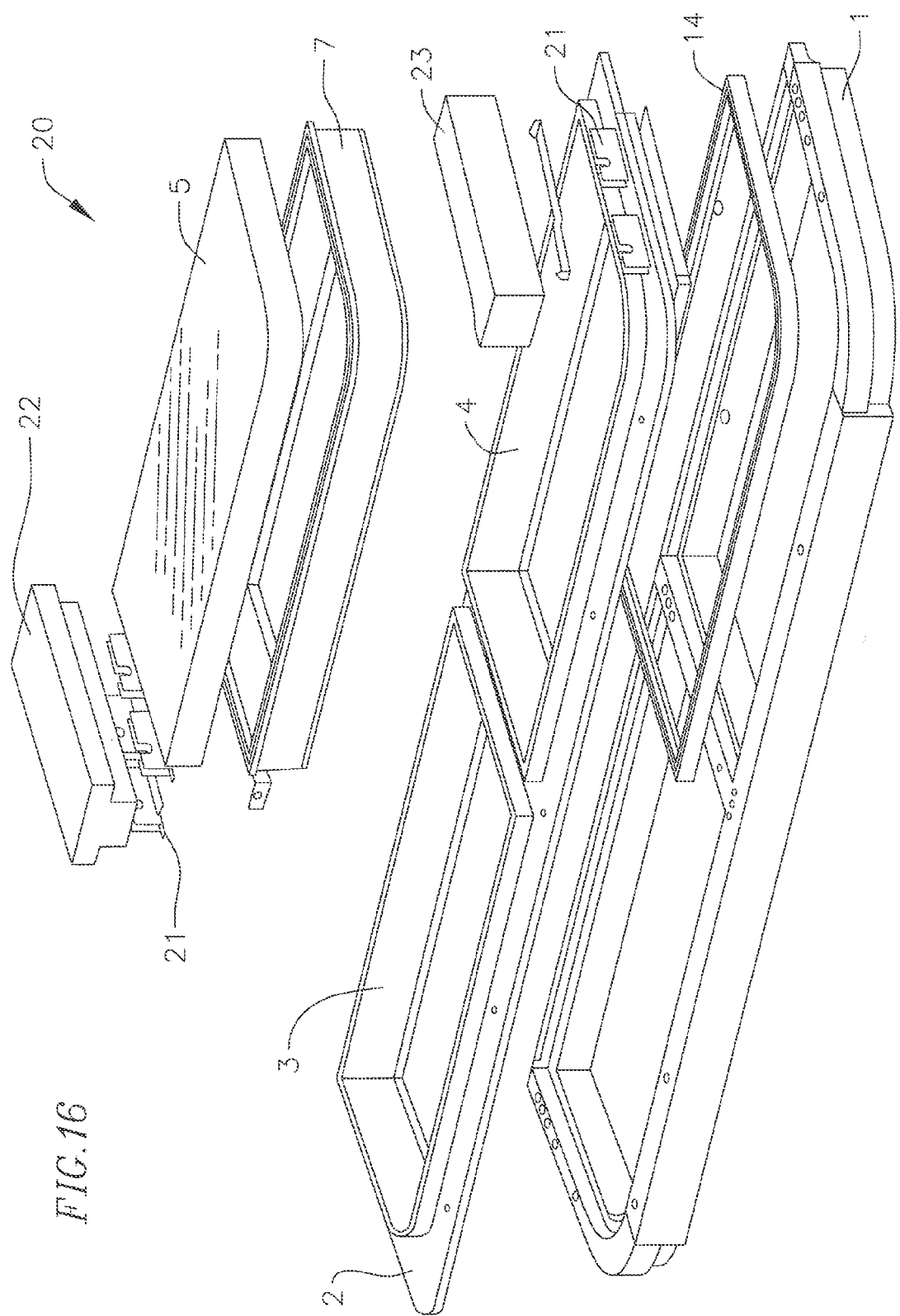
FIG. 16 is another partially exploded perspective view of the vehicle emergency egress system of FIG. 13.
Figure 18A:
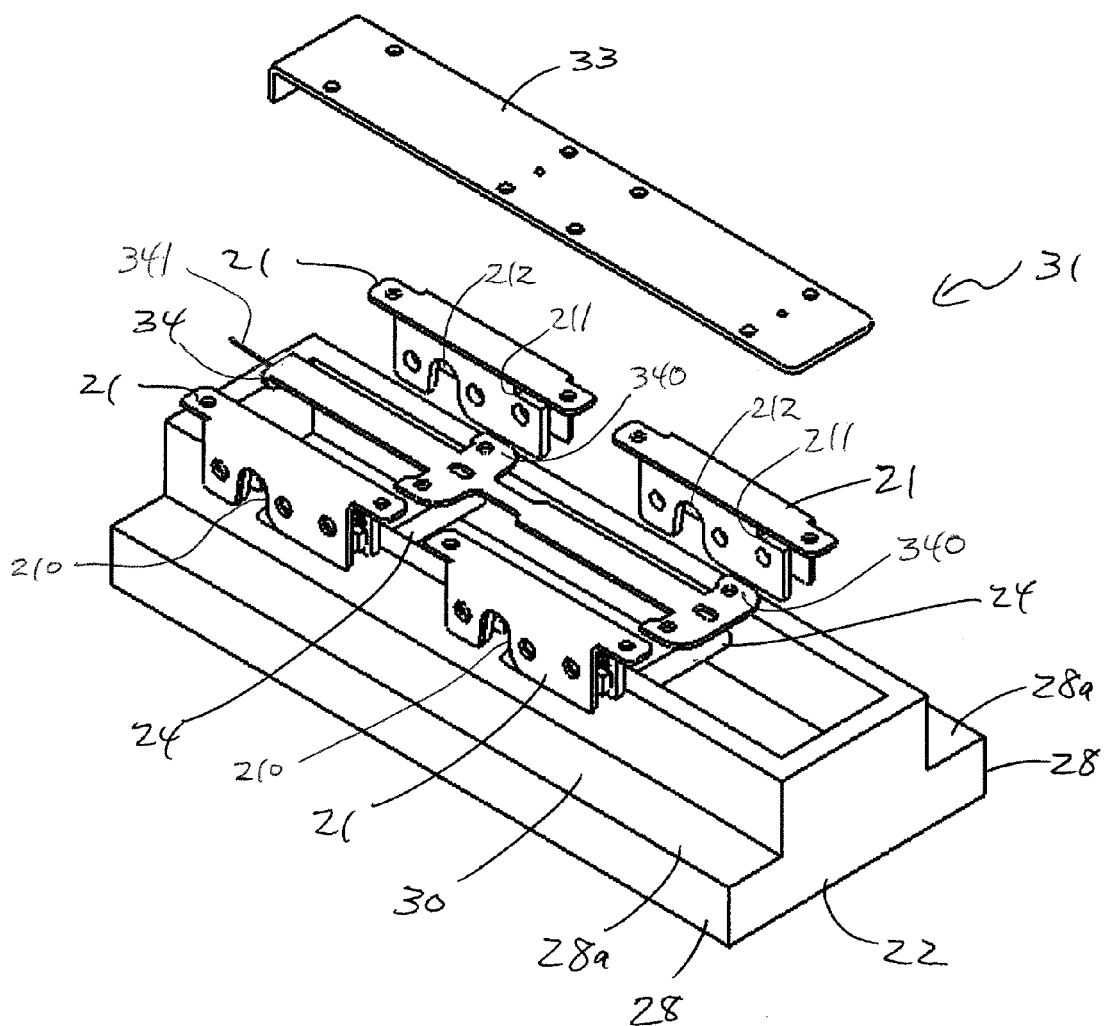
FIG. 18A is an exploded rear perspective view of an inboard retaining bracket and latches of the vehicle emergency egress system of FIG. 13.
Figure 18B:
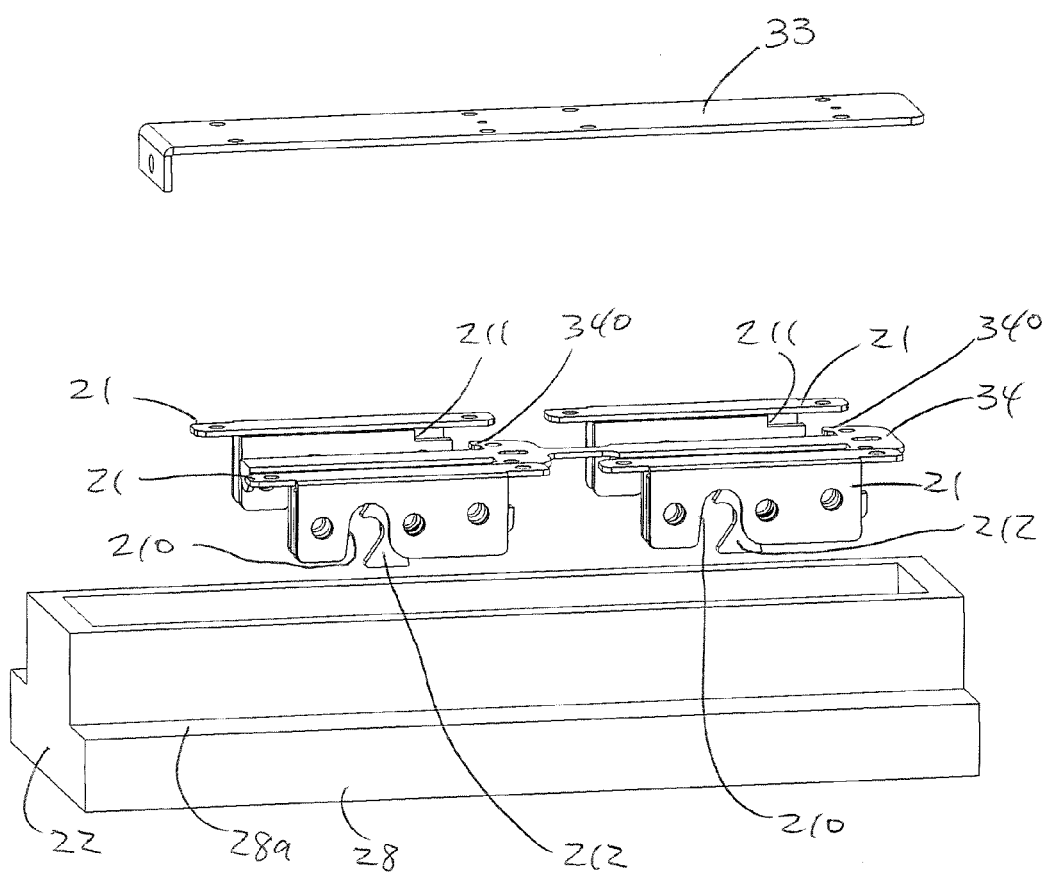
FIG. 18B is an exploded perspective view showing the inboard retaining bracket and latches of FIG. 18A.
Figure 19:
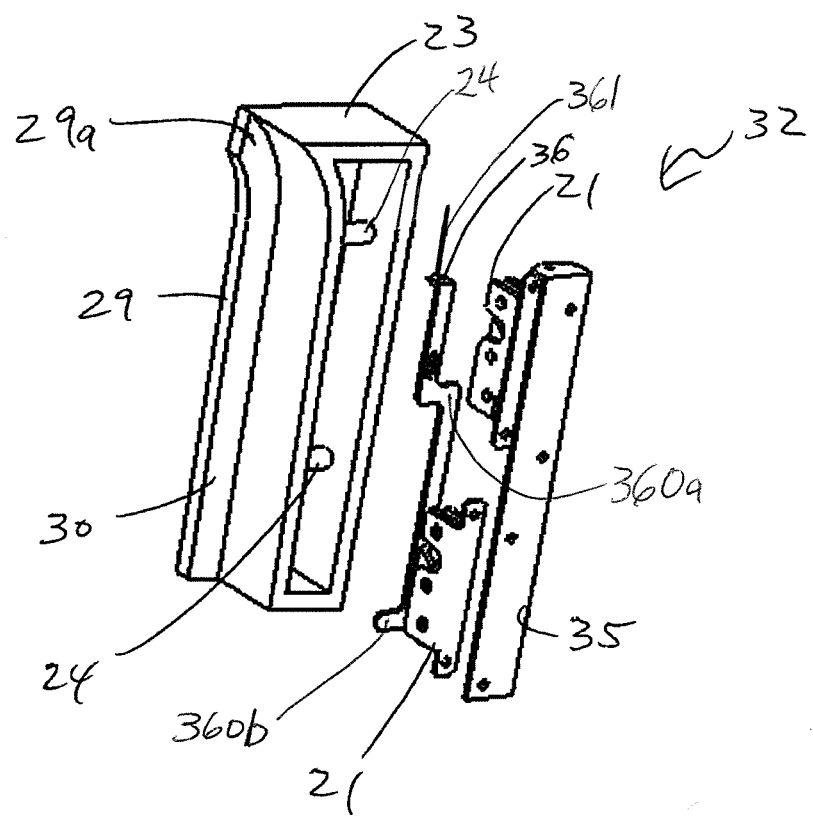
FIG. 19 is an exploded rear perspective view of an outboard retaining bracket and latches of the vehicle emergency egress system of FIG. 13.

As shown in FIG. 13 and in further detail in FIGS. 18A and 19, in one exemplary embodiment, the retaining brackets 22, 23 include flanged portions 28, 29, respectively, for abutting the outer surfaces of the transparent armor panels 5 for constraining and holding the transparent armor panels 5 in place in the respective cavities 3, 4 of the armor frame 2. Similar to the retaining brackets 8, 9 of the vehicle emergency egress system 10 described above, the inboard retaining bracket 22, in one exemplary embodiment, has two flanged portions 28 (see FIG. 18A), each of which is configured at a rear surface 28a thereof to clamp against at least a portion of the outer surface (e.g., a peripheral portion near an inboard edge) of a respective one of the transparent armor panels 5 and retain the transparent armor panel 5 in a respective one of the cavities 3, 4. Similarly, in one exemplary embodiment, each of the outboard retaining brackets 23 has one flanged portion 29 (see FIG. 19) that is configured at a rear surface 29a thereof to clamp against at least a portion of the outer surface (e.g., a peripheral portion near an outboard edge) of one of the transparent armor panels 5 and retain the transparent armor panel 5 in a respective one of the cavities 3, 4. Further, in one exemplary embodiment, the rear surfaces 28a, 29a of the flanged portions 28, 29 are lined with a protective material 30, such as TEFLON® or any other suitable material, configured to reduce or prevent damage to the outer surface of the transparent armor panels 5 and facilitate a snug fit of the transparent armor panels 5 into the cavities 3, 4.

In one exemplary embodiment, the vehicle emergency egress system 20 is configured such that all of the latches 21 may be simultaneously activated, or released, via a tension pull cable accessed from the interior of the vehicle by a lever mechanism (not shown). However, in alternative embodiments, the latches 21 may be released sequentially via one or more pull cables or other suitable devices. As shown in FIG. 17, an inboard latching assembly 31 for engaging the inboard retaining bracket 22, and an outboard latching assembly 32 for engaging the outboard retaining bracket 23 are attached to the armor frame 2 for retaining the respective inboard and outboard retaining brackets 22, 23 against the armor frame 2 and against the transparent armor panels 5 for holding the transparent armor panels 5 in the respective cavities 3, 4.

Figure 18C:
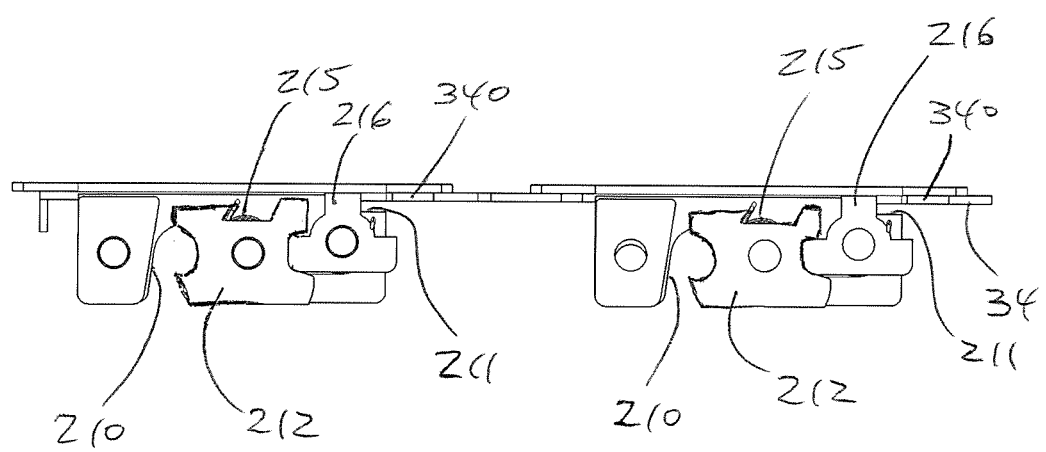
FIG. 18C is a side view of the latches of FIG. 18A with an outer wall not shown for purposes of illustration.

With reference to FIG. 18A, in one exemplary embodiment, the inboard latching assembly 31 includes a base plate 33 attached to the armor frame 2, latches 21 coupled to the base plate 33, and an actuator plate 34 that is slidable relative to the latches 21 for opening the latches 21 to disengage the inboard retaining bracket 22. Alternatively, the latches 21 may be attached directly to the armor frame 2 without the base plate 33. Additionally, in one exemplary embodiment, the inboard retaining bracket 22 includes one or more rods 24 on a rear side thereof. Each of the rods 24 is receivable in a recess 210 of one or more of the latches 21 and is engageable with a rod engagement portion 212 of one or more of the latches 21 for capturing the rod 24 in the recess 210 and holding the inboard retaining bracket 22 against an inboard edge of each of the transparent armor panels 5 and thereby retaining the transparent armor panels 5 over the openings of the respective cavities 3, 4 of the armor frame 2. The rod engagement portion 212 is configured to grab the rod 24 after the rod 24 has been pushed into the recess 210. The rod engagement portion 212 is biased toward a position of engagement with the rod 24 via a spring 215 (see FIG. 18C) in order to retain the rod 24 in the recess 210.

The actuator plate 34 includes protrusions 340 (see FIG. 18A) which are slidable into respective slots 211 of the latches 21 for applying a force, directly or indirectly, against the rod engagement portion 212 to overcome the biasing force of the spring 215 and disengage the rods 24 from the latches 21, thereby releasing the inboard retaining bracket 22 from the armor frame 2. For example, in one embodiment, the protrusion 340 of the actuator plate 34 applies a force against and rotates a pivot plate 216 (see FIG. 18C) which, in turn, applies a force against and rotates the rod engagement portion 212 to a position of disengagement in which the rod 24 is removable from the recess 210. The actuator plate 34 may be slidable via a tension cable 341 connected to an end of the actuator plate 34. In one embodiment, as shown in FIG. 18A, each of the rods 24 engages two of the latches 21. However, in other embodiments, each of the rods 24 may engage one latch 21 or more than two latches 21. Also, in an alternative embodiment, the latches 21 may be attached to the inboard retaining bracket 22, and the rods 24 may be on the armor frame 2 for engaging the latches 21 and holding the inboard retaining bracket 22 against the armor frame 2.

In one exemplary embodiment, when the tension cable 341 described above is pulled by an occupant of the vehicle, the actuator plate 34 slides to disengage the latches 21 and release the rods 24 of the retaining brackets 22, 23, which, in turn, releases the retaining brackets 22, 23 and allows the transparent armor panels 5 to be pushed out from the cavities 3, 4 of the armor frame 2. Further, the vehicle emergency egress system 20, similar to the vehicle emergency egress system 10 described above, may include a biasing mechanism, such as a spring, a piston, a push/pull pin device, a solenoid, or any other suitable biasing mechanism or device for expelling the transparent armor panels 5 from the cavities 3, 4 once the retaining brackets 22, 23 are released, and/or a biasing mechanism, such as a spring, a piston, a push/pull pin device, a solenoid, or any other suitable biasing mechanism for pushing the retaining brackets 22, 23 away from the armor frame 2.

Similarly, with reference to FIG. 19, in one exemplary embodiment, each of the outboard latching assembly 32 includes a base plate 35 attached to the armor frame 2, latches 21 coupled to the base plate 35, and an actuator plate 36 that is slidable relative to the latches 21 for opening the latches 21 to disengage the respective outboard retaining bracket 22. Alternatively, the latches 21 may be attached directly to the armor frame 2 without the base plate 35. Although only the passenger-side outboard retaining bracket 23 and outboard latching assembly 32 are shown in the drawings, the driver-side outboard retaining bracket 23 and outboard latching assembly 32 may have essentially the same construction and may be formed as a mirror image of the passenger-side outboard retaining bracket 23 and outboard latching assembly 32, respectively.

In one embodiment, each of the outboard retaining brackets 23 includes one or more rods 24 on a rear side thereof, each of the rods 24 being receivable in the recess 210 of the latch 21 and being engageable with the rod engagement portion 212 of one or more of the latches 21 for capturing the rod 24 in the recess 210 for holding one of the outboard retaining brackets 23 against an outboard edge of one of the transparent armor panels 5 and thereby retaining the transparent armor panel 5 over the opening of the respective cavity 3, 4 of the armor frame 2. The actuator plate 36 includes protrusions 360a and 360b which are slidable into respective slots 211 of the latches 21 for applying a force, directly or indirectly, against the rod engagement portion 212 to overcome the biasing force of the spring 215 and disengage the rods 24 from the latches 21, thereby releasing the outboard retaining bracket 23 from the armor frame 2. The actuator plate 36 may be slidable via a tension cable 361 connected to an end of the actuator plate 36. That is, in an exemplary embodiment, the latches 21 of the outboard latching assemblies 32 are engageable with and disengageable from the rods 24 in a same or similar manner as described above with respect to the inboard latching assembly 31. In one embodiment, as shown in FIG. 19, each of the rods 24 engages a corresponding one of the latches 21. However, in other embodiments, each of the rods 24 may engage two or more latches 21. Also, in an alternative embodiment, the latches 21 may be attached to the outboard retaining brackets 23, and the rods 24 may be on the armor frame 2 for engaging the latches 21 and holding the outboard retaining brackets 23 against the armor frame 2.

In one embodiment, the tension cable 361 of one or more of the outboard latching assemblies 32 is connected to the tension cable 341 of the inboard latching assembly 31 described above, such that one or more of the outboard retaining brackets 23 may be released together with the inboard retaining bracket 22. Alternatively, the tension cables 361 of the outboard latching assemblies 32 may be independent of the tension cable 341 and/or of each other.

Similar to the vehicle emergency egress system 10 described above, the inboard and outboard retaining brackets 22, 23 of the vehicle emergency egress system 20 provide an amount of applied force to the outer surface of the transparent armor panel 5 to provide stability and environmental sealing. The retaining brackets 22, 23 may be installed via a draw bolt, as is well known in the art, for installing and latching the retaining brackets 22, 23 in place. The latches 21, in one embodiment, may be OEM issued latches, such as Model Nos. EC 12340039-1 and EC 12340039-2 by The Eastern Company, or alternatively, may be any other suitable latching-type mechanisms or combination thereof for providing suitable restraining force on the retaining brackets 22, 23. Further, while the inboard retaining bracket 22 is shown being held by four latches 21 and the outboard retaining bracket 23 is shown being held by two latches 21, the number and position of the latches 21 may be varied as suitable depending on various aspects (e.g., dimensions) of the vehicle on which the vehicle emergency egress system 20 is integrated. Additionally, the inboard and outboard latching assemblies 31, 32 may be constructed of any suitable armor-grade or non-armor-grade material or combination of materials, depending on a ballistic requirement.

Figure 20:
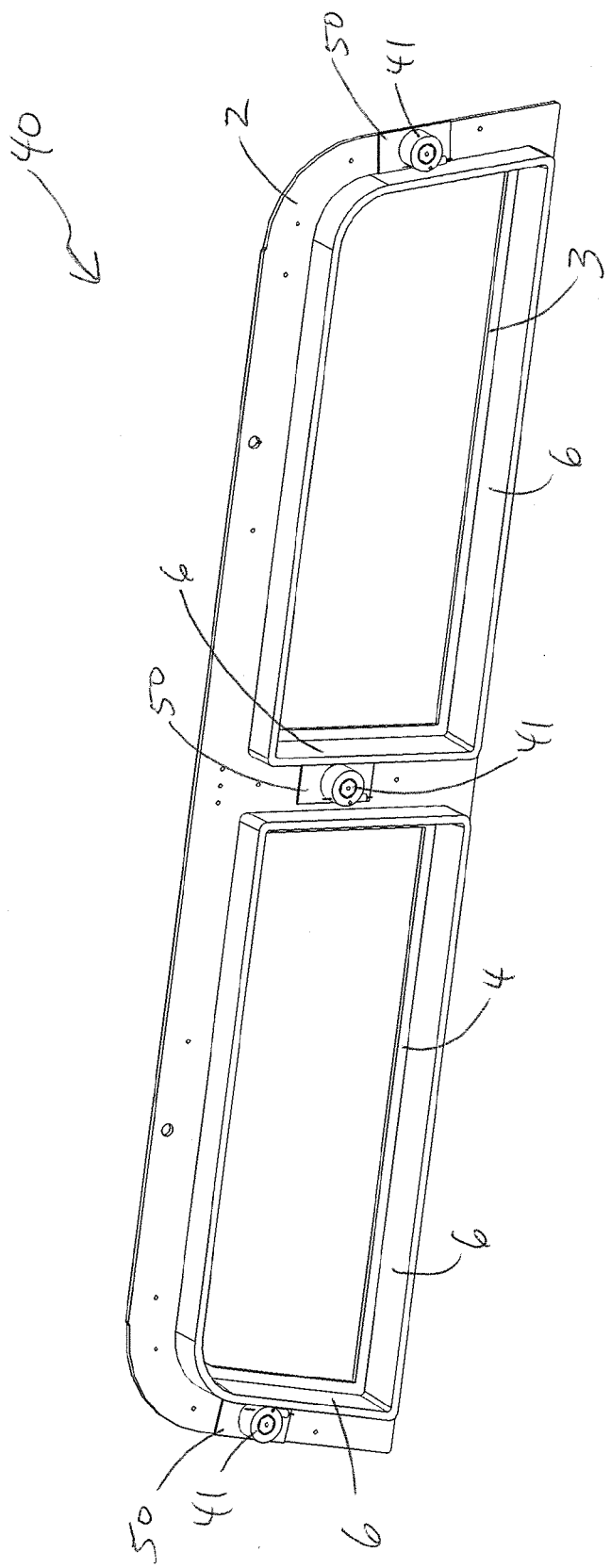
FIG. 20 is a front perspective view of a restraint device on a frame of a vehicle emergency egress system according to another embodiment of the present invention.

With reference to FIG. 20, a vehicle emergency egress system 40 according to another exemplary embodiment of the present invention includes one or more restraint devices 41, rather than the pyrotechnically shearable bolts 11 or latches 21 described above, for holding one or more retaining brackets in place for retaining the transparent armor panels 5 (not shown in FIG. 20) in the cavities 3, 4 of the armor frame 2. Although not shown in FIG. 20, the retaining brackets of the vehicle emergency egress system 40 may be the same or similar to the inboard and outboard retaining brackets 8, 9 of the vehicle emergency egress system 10 or the inboard and outboard retaining brackets 22, 23 of the vehicle emergency egress system 20 described above. Alternatively, the vehicle emergency egress system 40 may include any other suitable retaining brackets configured to retain the transparent armor panels 5 in the cavities 3, 4 of the armor frame 2. For purposes of description, the vehicle emergency egress system 40 will be described hereinafter in connection with the retaining brackets 8, 9.

Figure 21:
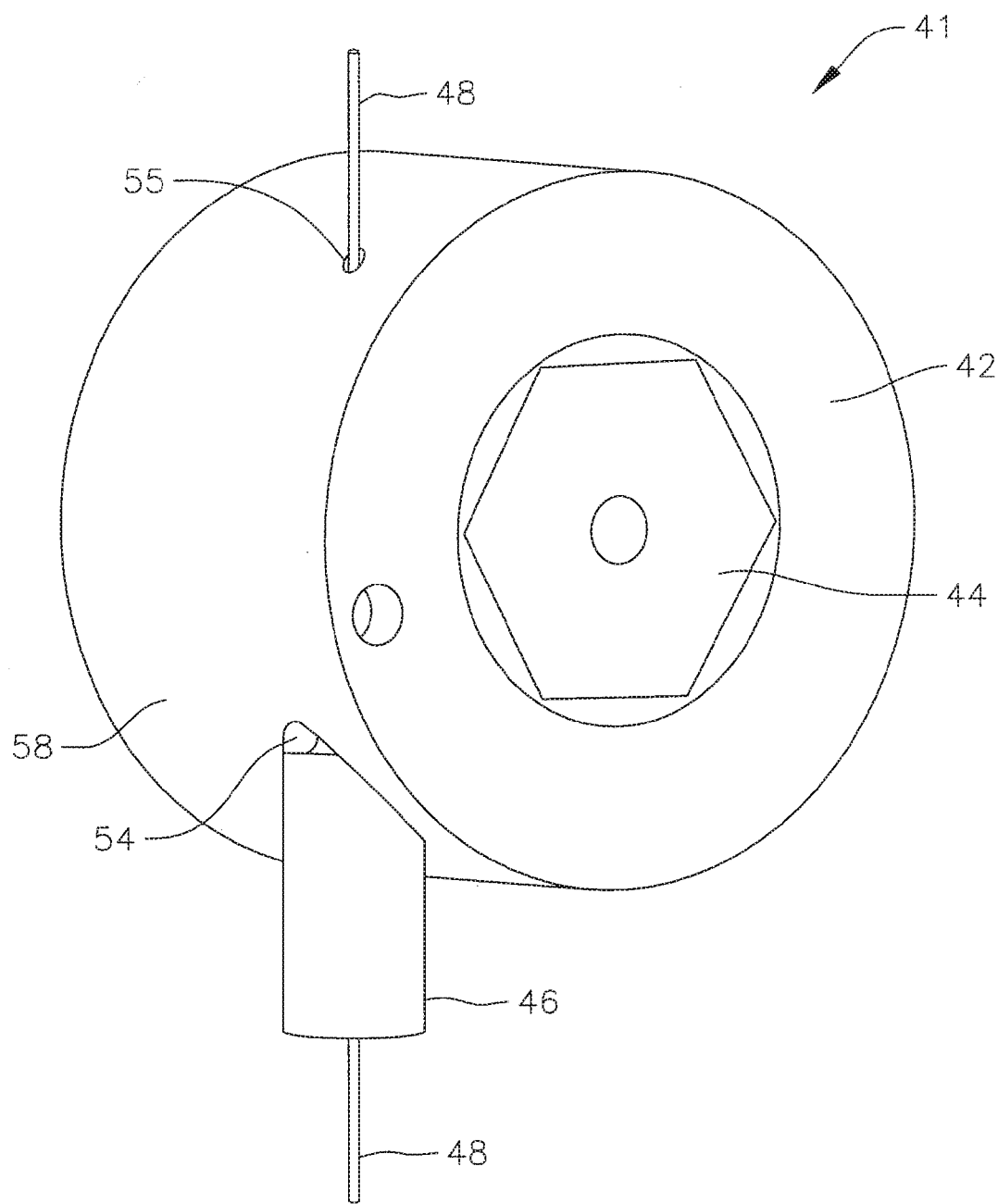
FIG. 21 is a front perspective view of the restraint device of FIG. 20.

With reference to FIG. 21, in one exemplary embodiment, the restraint device 41 includes a frame mounting portion 42 mounted to the armor frame 2, a bracket mounting portion 44 mounted to the retaining bracket 8, 9, and a pin 46 that is movable between an engaging position in which the restraint device 41 maintains the retaining bracket attached to the armor frame 2 and retaining the transparent armor panel 5 in the cavity 3, 4 and a releasing position in which the retaining bracket is removable from the minor frame 2 for removing the transparent armor panel 5 from the cavity 3, 4. Further, in an exemplary embodiment, the restraint device 41 includes a cable 48 for displacing the pin 46 between the engaging position and the releasing position. In one embodiment, the cable 48 is attached to the pin 46. The cable 48 is displaceable, such as when pulled by a user (e.g., an occupant of the vehicle), relative to the bracket mounting portion 44 for moving the pin 46 between the engaging position and the releasing position. That is, when pulled, the cable 48 is moved and displaces the pin 46 from the engaging position to the releasing position such that the transparent armor panel 5 may be removed from the cavity 3, 4 for egress. Further, in one embodiment, when the cable is released, the pin 46 moves back to the engaging position, although, once moved back, it is no longer engaging the bracket mounting portion 44 if the retaining bracket 8, 9 has been detached from the armor frame 2.

Figure 22:
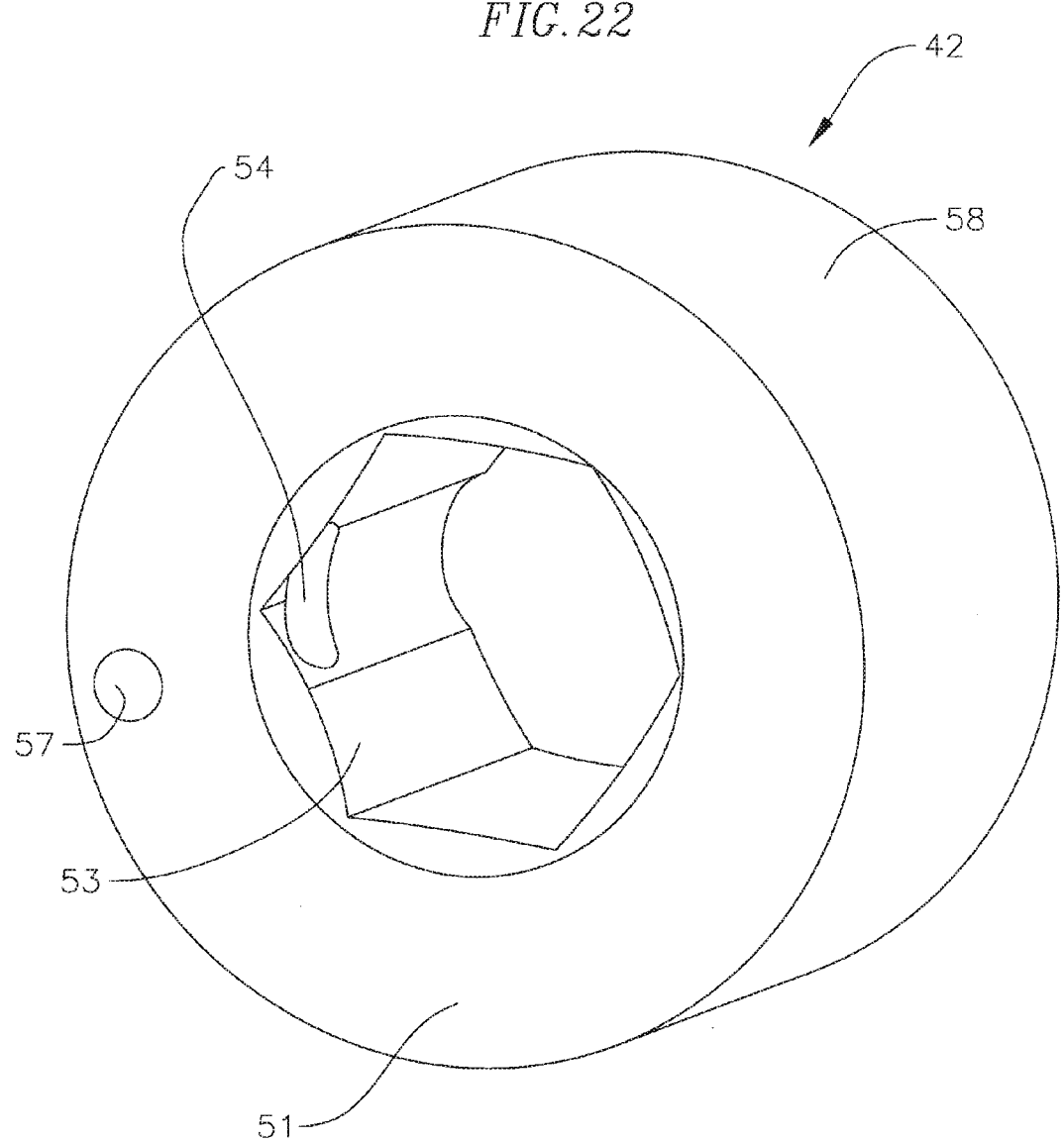
FIG. 22 is a front perspective view of a frame mounting portion of the restraint device of FIG. 20.
Figure 23:
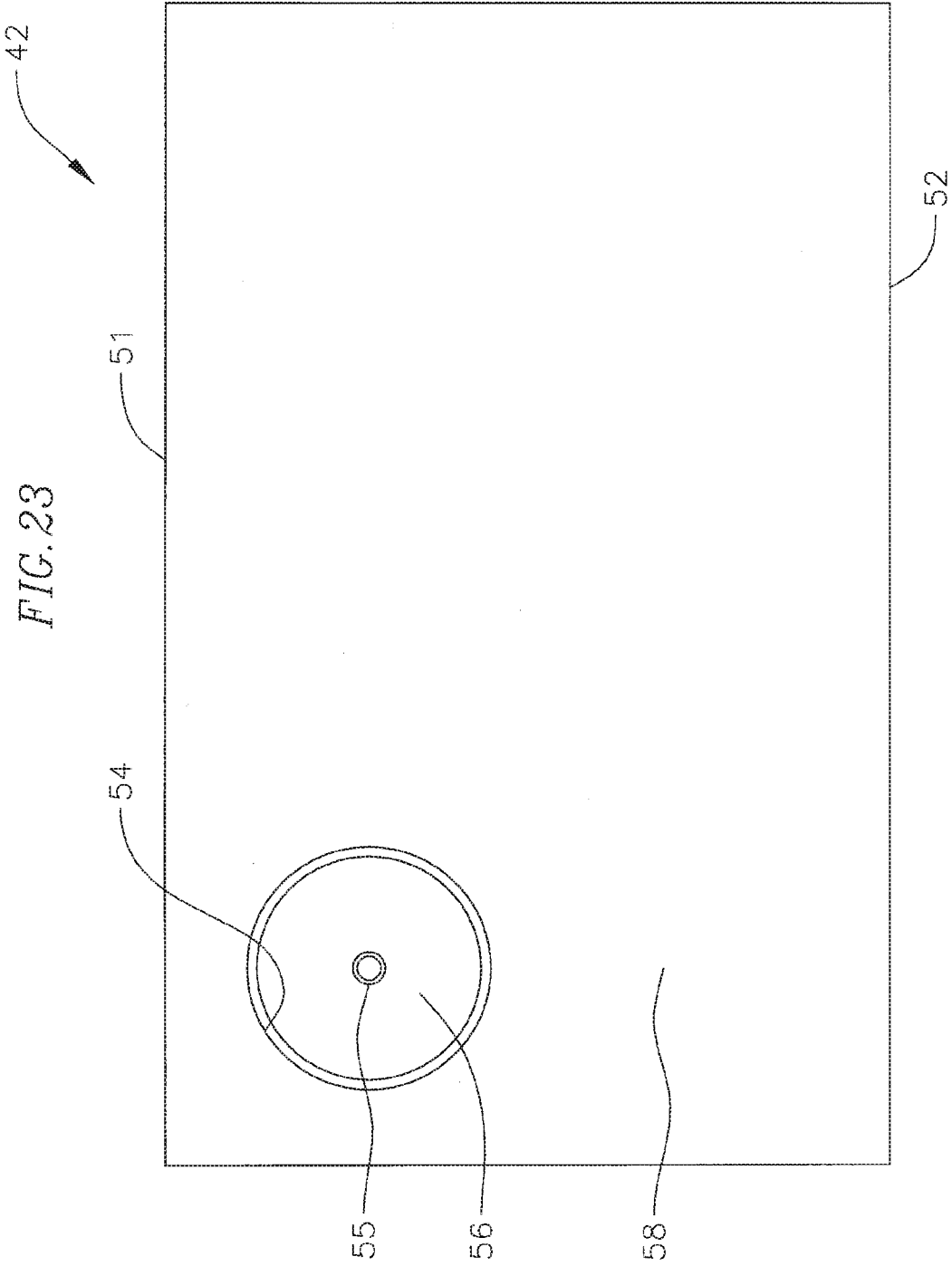
FIG. 23 is a bottom view of the frame mounting portion of the restraint device of FIG. 22.
Figure 26:
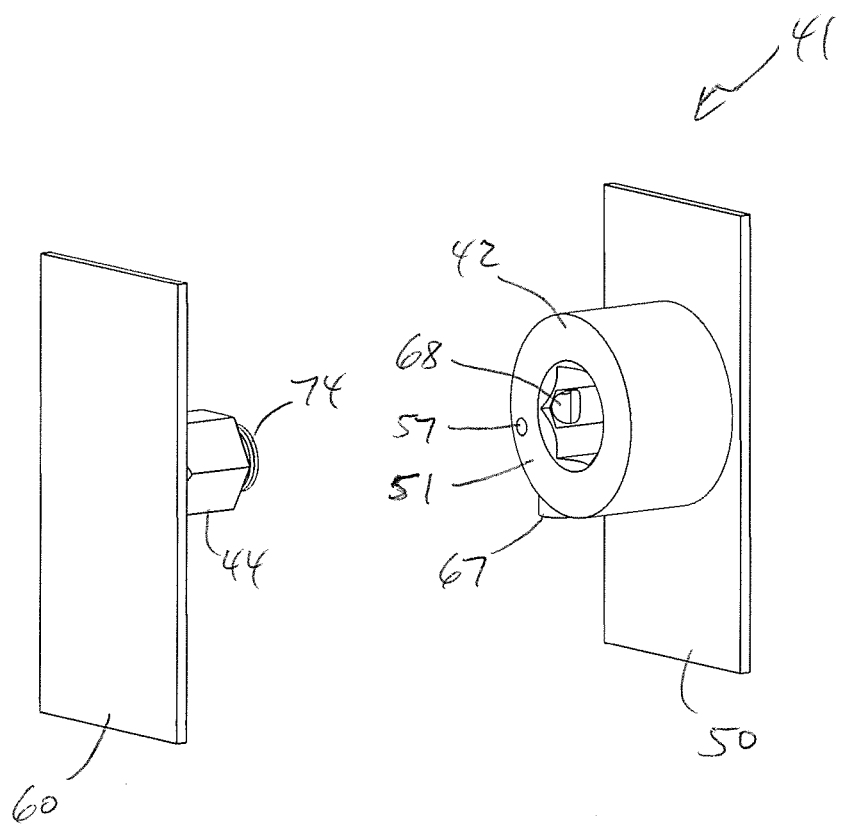
FIG. 26 is a front perspective view of the restraint device of FIG. 20, shown in a released state.

As shown in FIGS. 22 and 23, the frame mounting portion 42 includes a front side 51 and a rear side 52. In one embodiment, as shown in FIG. 26, the frame mounting portion 42 is attached to a plate 50 via bolts, welding, or any other suitable device or method, and the plate 50 is mounted to the minor frame 2 (e.g., using bolts or welding) (see FIG. 20). Alternatively, the rear side 52 of the frame mounting portion 42 may be attached to the armor frame 2 without the plate 50, such as by welding, fasteners, or any other suitable device or method. The frame mounting portion 42 has a first cavity 53 extending in a direction from the front side 51 toward the rear side 52 and a second cavity 54 extending in a direction substantially perpendicular to the first cavity 53. Further, the second cavity 54 intersects, or breaks into, the first cavity 53, as shown in FIG. 22. The second cavity 54 extends through a peripheral side 58 of the frame mounting portion 42 that is between the front side 51 and the rear side 52, as shown in FIG. 21, and the second cavity 54 is defined at an opposite end by a recessed surface 56 (see FIGS. 23 and 28). The frame mounting portion 42 also has an opening 55 through the recessed surface 56 and extending through a region of the peripheral side 58 opposite a region of the peripheral side 58 through which the second cavity 54 extends, as shown in FIG. 21. As described further below, the cable 48 is received through the opening 55. Further, in one embodiment, the frame mounting portion 42 has an opening 57 through the front side 51 and extending into the second cavity 54.

Figure 24:
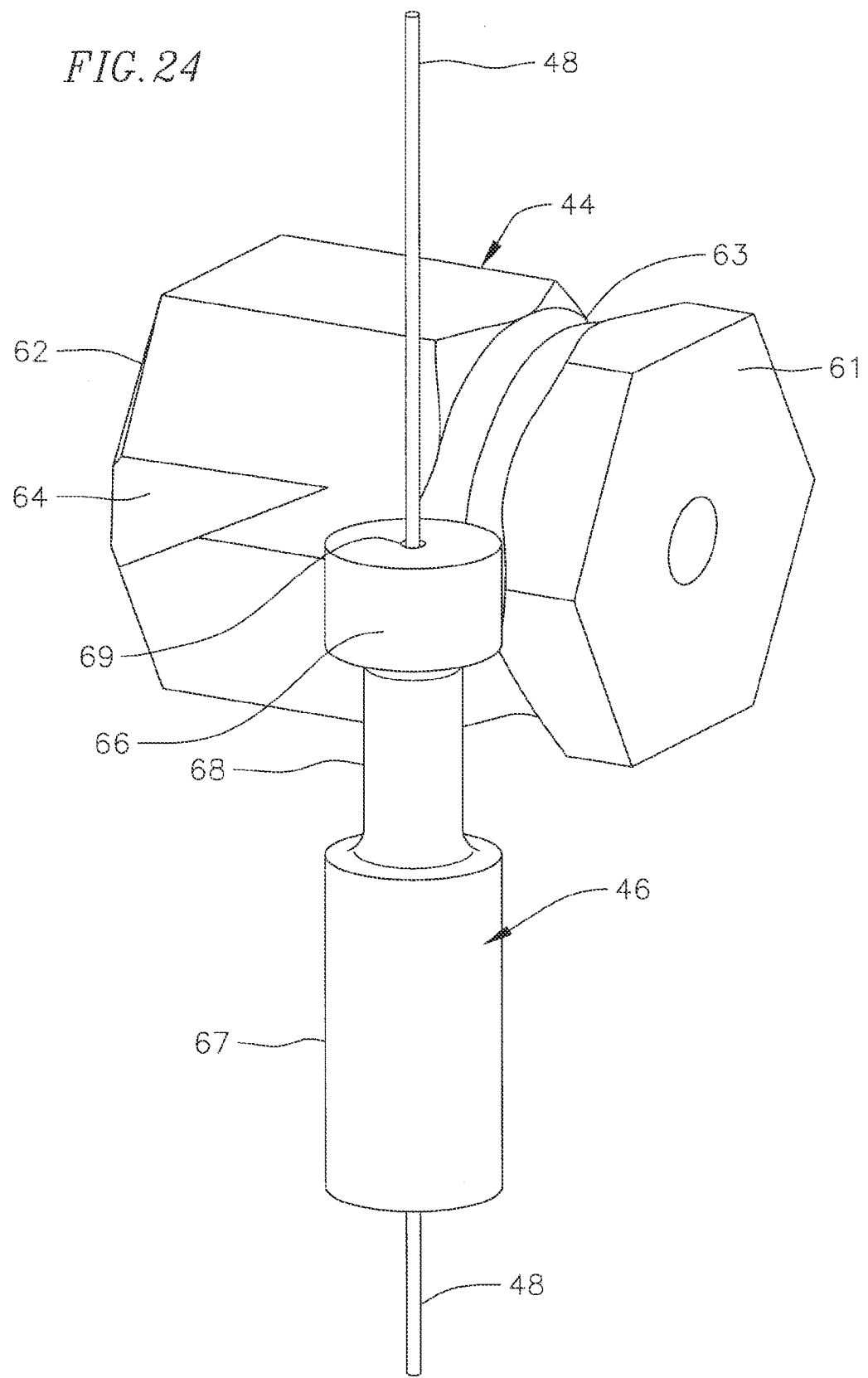
FIG. 24 is a front perspective view of a pin and a bracket mounting portion of the restraint device of FIG. 20.
Figure 25:
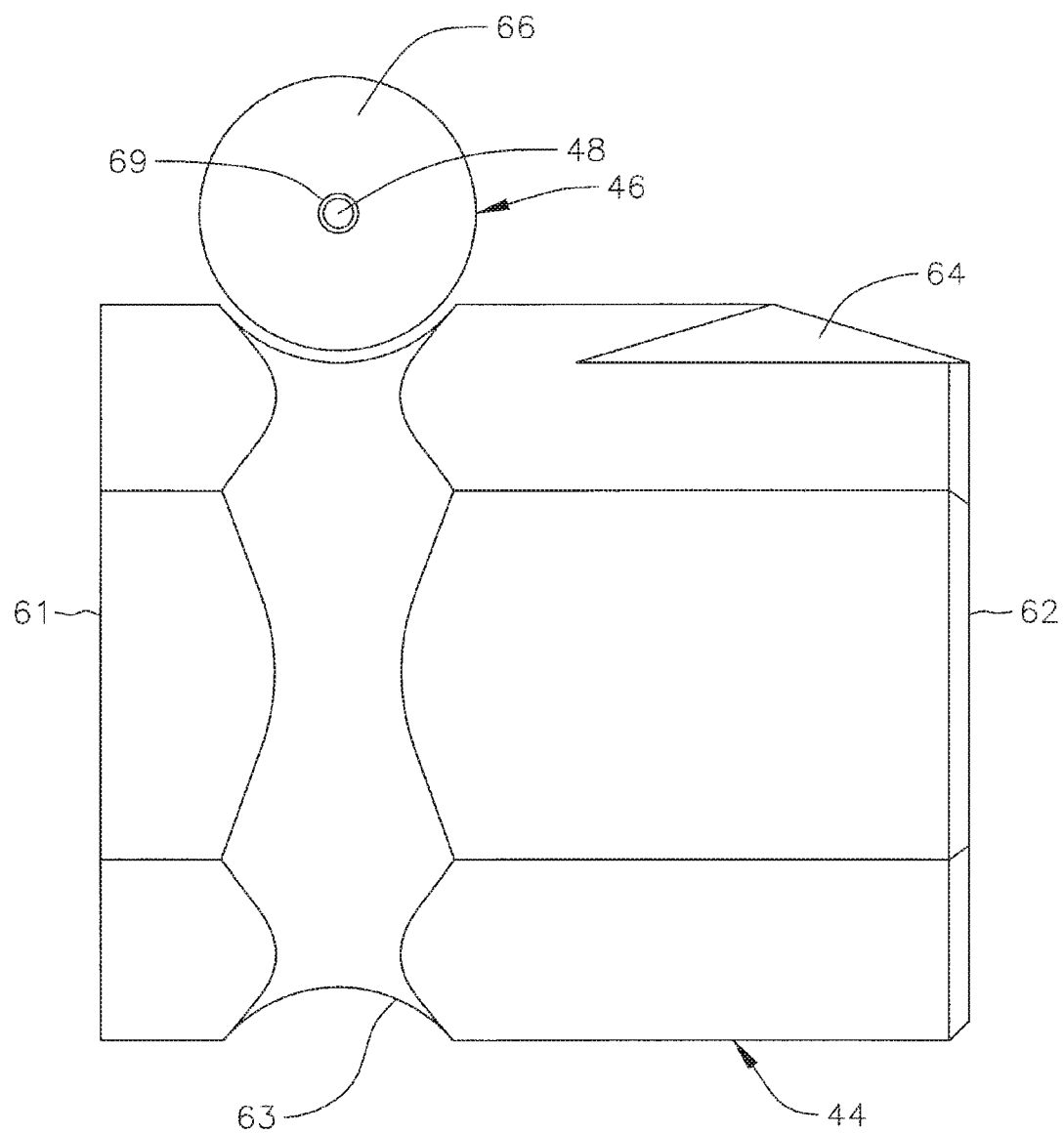
FIG. 25 is a top view of the pin and the bracket mounting portion of the restraint device of FIG. 24.
Figure 27:
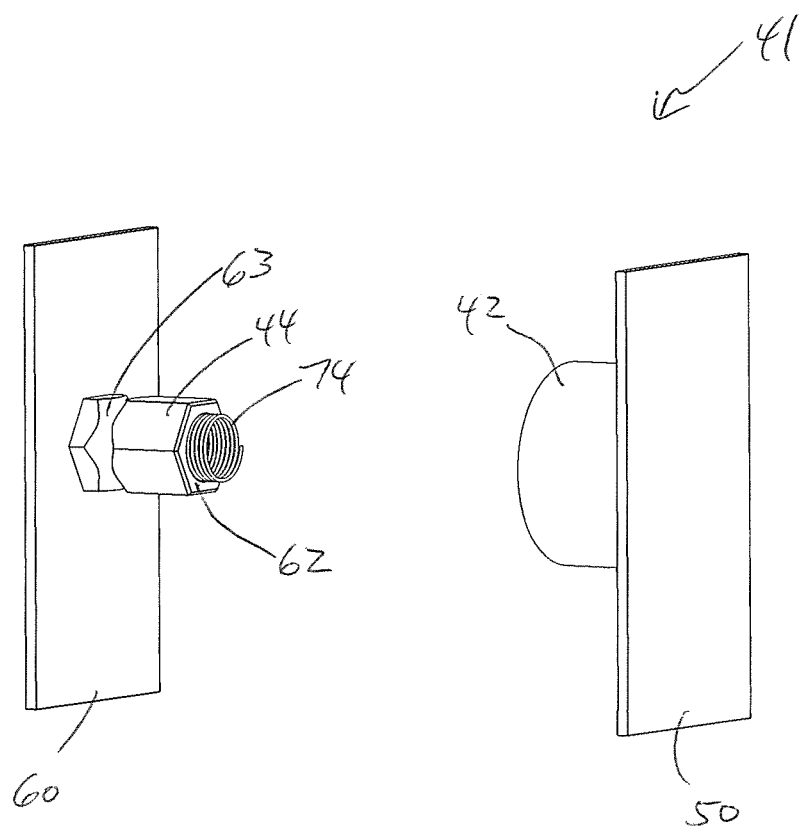
FIG. 27 is a rear perspective view of the restraint device of FIG. 20, shown in the released state.

With reference to FIGS. 24 and 25, the bracket mounting portion 44 includes a front side 61 and a rear side 62 corresponding to the front side 51 and the rear side 52, respectively, of the frame mounting portion 42. In one embodiment, as shown in FIG. 27, the bracket mounting portion 44 is attached to a plate 60 via bolts, welding, or any other suitable device or method, and the plate 60 is mounted to one of the retaining brackets 8, 9 (e.g., using bolts or welding). Alternatively, the front side 61 of the bracket mounting portion 44 may be attached to the retaining bracket 8, 9 without the plate 60, such as by welding, fasteners, or any other suitable device or method. Also, in one embodiment, the plate 60 may function as a retaining bracket in lieu of the retaining bracket 8, 9. The bracket mounting portion 44 has a groove 63 formed along a side that is between the front side 61 and the rear side 62. The groove 63 may extend completely or partially around a perimeter of the bracket mounting portion 44. Further, in one embodiment, the side having the groove 63 formed therein has a tapered, or beveled, portion 64 adjacent the rear side 62. The pin 46 includes a bearing portion 66 and a necked portion 68 adjacent the bearing portion 66. In one embodiment, as shown in FIG. 24, the pin 46 has a substantially cylindrical shape with the bearing portion 66 being at a first end and the necked portion 68 being between the bearing portion 66 and a cable engagement portion 67 that is at a second end opposite the bearing portion 66. The necked portion 68 has a diameter smaller than a diameter of the bearing portion 66. The cable 48 extends in a longitudinal direction of the substantially cylindrically shaped pin 46. In one embodiment, the pin 46 has an opening 69 extending therethrough in the longitudinal direction for receiving the cable 48.

Figure 28:
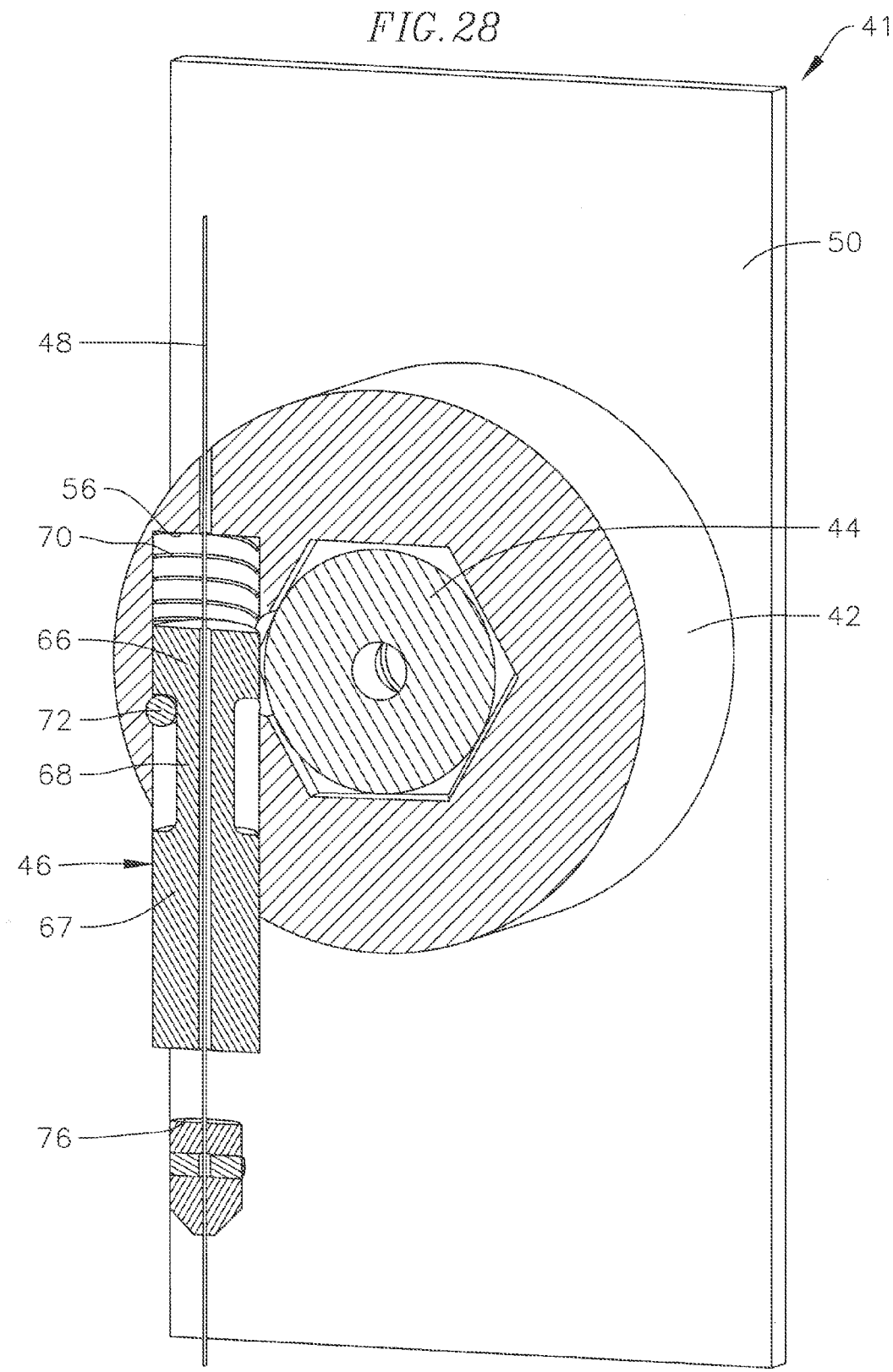
FIG. 28 is a sectional view of the restraint device of FIG. 20, the pin shown in an engaging position.
Figure 29:
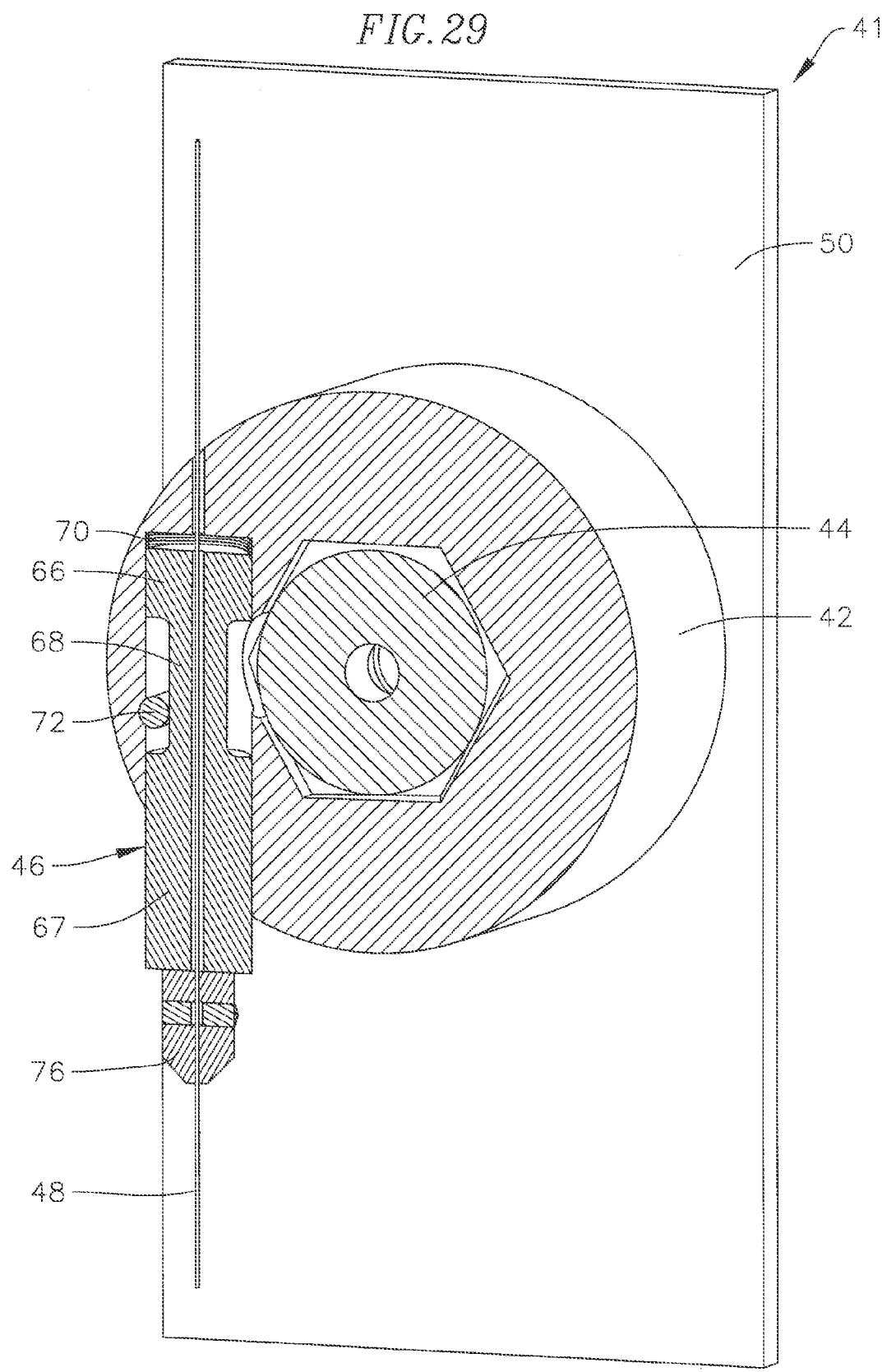
FIG. 29 is a sectional view of the restraint device of FIG. 20, the pin shown in a releasing position.

With further reference to FIG. 21, in one embodiment, the bracket mounting portion 44 is received in the first cavity 53 of the frame mounting portion 42. That is, in one embodiment, the frame mounting portion 42 is a female portion and the bracket mounting portion 44 is a male portion. However, embodiments of the present invention are not limited thereto and, in another embodiment, the bracket mounting portion 44 may be configured as a female portion and the frame mounting portion 42 may be configured as a male portion that is receivable in the bracket mounting portion 44. With further reference to FIG. 21, the pin 46 is received in the second cavity 54 of the frame mounting portion 42. The pin 46 is shown in FIGS. 24 and 28 in the engaging position. That is, in the engaging position, the bearing portion 66 of the pin 46 extends into the groove 63 such that the bracket mounting portion 44 cannot be removed from the first cavity 53 of the frame mounting portion 42, thereby holding the retaining bracket 8, 9 attached to the armor frame 2. The bearing portion 66 does not extend into the groove 63 when the pin 46 is in the releasing position, as shown in FIG. 29. Further, when the pin 46 is in the releasing position, the necked portion 68 is adjacent the groove 63, thus allowing the bracket mounting portion 44 to disengage from the frame mounting portion 42.

In one embodiment, the restraint device 41 includes a spring 56 (see FIGS. 28 and 29), or any other suitable biasing mechanism, for biasing the pin 46 toward the engaging position such that a predetermined force must be applied to displace the pin 46 to the releasing position and to prevent or substantially prevent the retaining bracket 8, 9 from detaching from the armor frame 2 when not intended to do so. In one embodiment, the spring 56 is a compression spring between the bearing portion 66 and the recessed surface 56 of the frame mounting portion 42. The tapered surface 64 of the bracket mounting portion 44 facilitates insertion of the bracket mounting portion 44 into the first cavity 53 and, at the same time, pushes the pin 46 against the spring 56.

With reference to FIGS. 26 and 27, the restraint device 41 is shown in a released state, that is, the bracket mounting portion 44 is shown disengaged and separated from the frame mounting portion 42. The restraint device 41, in one embodiment, includes a biasing mechanism 74, such as a spring or any other suitable biasing device, configured to push the bracket mounting portion 44 away from the frame mounting portion 42 when the pin 46 is moved to the releasing position.

With reference to FIGS. 28 and 29, the pin 46 is shown in the engaging position in FIG. 28 and in the releasing position in FIG. 29. That is, in the engaging position, shown in FIG. 28, the bearing portion 66 of the pin 46 is aligned in a longitudinal direction with the groove 63 of the bracket mounting portion 44 and extends into the groove 63. In the releasing position, shown in FIG. 29, the bearing portion 66 of the pin 46 is not aligned in the longitudinal direction with the groove 63 of the bracket mounting portion 44 and does not extend into the groove 63. Rather, in the releasing position, the pin 46 is displaced toward the recessed surface 56, and the necked portion 68 of the pin 46 is aligned with the groove 63 of the bracket mounting portion 44. The necked portion 68 has a smaller diameter than the bearing portion 66 and does not extend into the groove 63, thereby allowing the bracket mounting portion 44 to be removed from the first cavity 53 of the frame mounting portion 42. The dimensions shown in FIGS. 28 and 29 are for reference only and are not intended to limit embodiments of the present invention. As shown in FIGS. 28 and 29, in one embodiment, the cable 48 passes through the opening 55 of the frame mounting portion 42 and through the opening 69 of the pin 46, and a pin engagement member 76 is fixed to the cable 48 such that when the cable 48 is displaced, the pin engagement member 76 abuts the cable engagement portion 67 of the pin 46 and forces the pin 46 from the engaging position to the releasing position. Alternatively, the cable 48 may be attached directly to the pin 46 for moving the pin 46 from the engaging position to the releasing position. Further, in one embodiment, as shown in FIGS. 28 and 29, the restraint device 41 includes a retaining pin 72 received in the opening 57 (e.g., installed by press-fitting) for retaining the pin 46 in the second cavity 54.

The vehicle emergency egress system 40 may include a plurality of restraint devices 41, as shown in FIG. 20, each holding one or more retaining brackets 8, 9, and the cable 48 may be a common cable coupled to the pins 46 of some or all of the restraint devices 41. For example, the vehicle emergency egress system 40 may be configured such that a user can release all of the retaining brackets 8, 9 by pulling one cable 48. As such, disengagement of the restraint devices 41 and removal of the transparent armor panels 5 may be facilitated.

Figure 30:
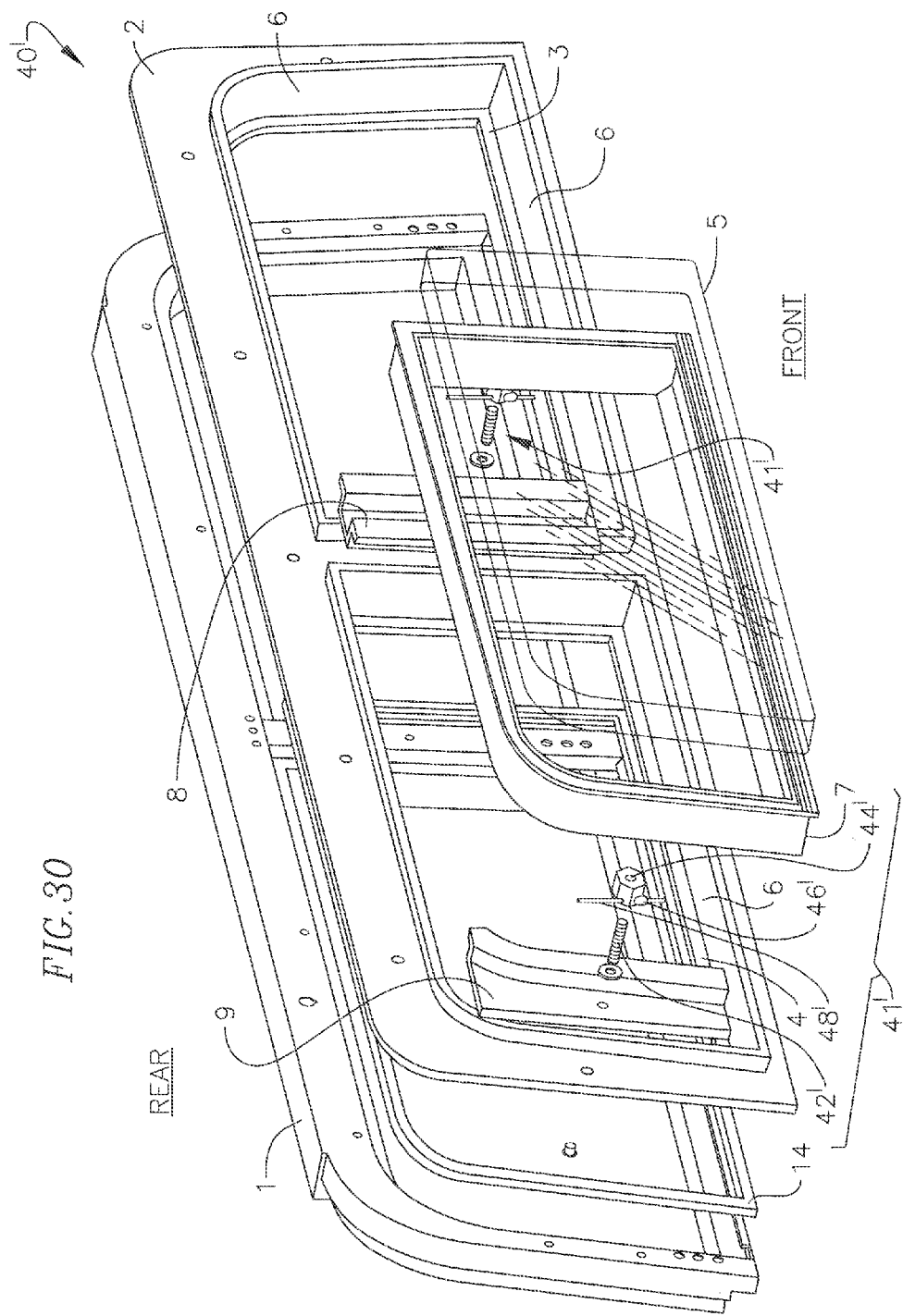
FIG. 30 is a front perspective view of a restraint device on a frame of a vehicle emergency egress system according to another embodiment of the present invention.

As described above, in another embodiment, a bracket mounting portion may be configured as a female portion and a frame mounting portion may be configured as a male portion that is receivable in the bracket mounting portion. With reference to FIG. 30, such an embodiment is illustrated. A vehicle emergency egress system 40' includes restraint devices 41' for attaching the retaining brackets 8, 9 to the armor frame 2 and holding the transparent armor panels 5 in the cavities 3, 4 thereof. The restraint device 41' includes a frame mounting portion 42' which, in one embodiment, is configured as a stud, and a quick-release nut 44' configured to receive the stud in an opening thereof. The frame mounting portion 42' is attached to the armor frame 2 and extends through the hole 8c, 9c of the retaining bracket 8, 9. The quick-release nut 44' abuts a front surface of the base portion 8a, 9a of the retaining bracket 8, 9 and holds the retaining bracket 8, 9, in place against the armor frame 2. The quick-release nut 44', in one embodiment, includes a pin 46' and a cable 48' for displacing the pin 46' from an engaging position to a releasing position, similar in structure and function to the pin 46 and the cable 48 of the restraint device 41 described above. As such, the quick-release nut 44' may be released by an occupant of the vehicle via a mechanism for pulling the cable 48'. Furthermore, the cables 48' of one or more of the restraint devices 41' may be connected such that the quick-release nuts 44' of one or more of the restraint devices 41' may be released simultaneously or sequentially via a single mechanism.

Figure 31:
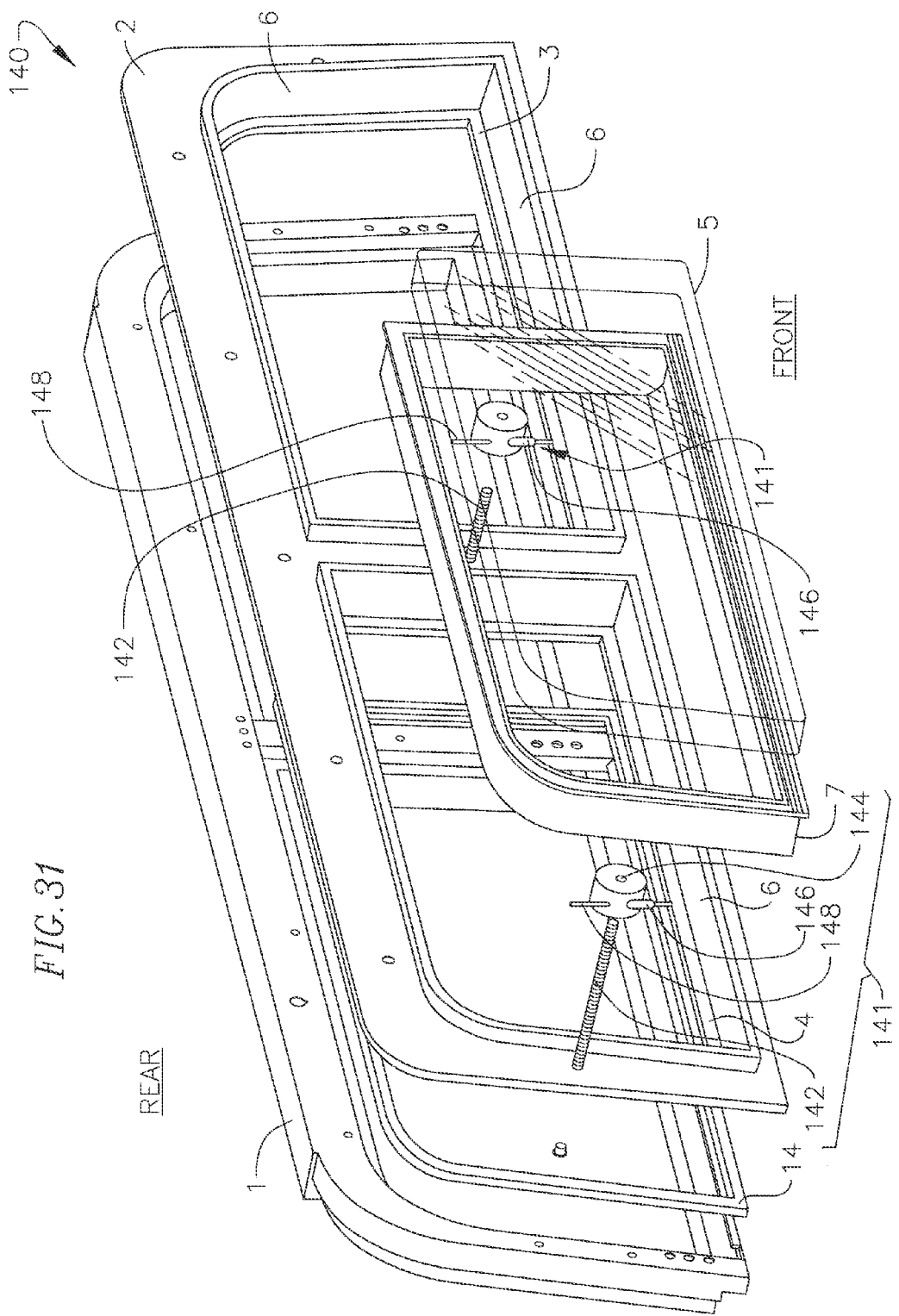
FIG. 31 is a front perspective view of a restraint device on a frame of a vehicle emergency egress system according to another embodiment of the present invention.

With reference to FIG. 31, a vehicle emergency egress system 140 according to another embodiment of the present invention includes restraint devices 141 for holding the transparent armor panels 5 in the cavities 3, 4 of the armor frame 2. The restraint device 141 includes a frame mounting portion 142 which, in one embodiment, is configured as a stud, and a bracket 144, or quick-release nut, configured to receive the stud in an opening thereof. The frame mounting portion 142 is attached to the armor frame 2. The bracket 144 extends over one or more of the transparent armor panels 5 and abuts a front surface of the one or more transparent armor panels 5 for holding the transparent armor panels 5 in the cavities 3, 4 of the armor frame 2. That is, unlike the vehicle emergency egress system 40' described above and shown in FIG. 30, the retaining brackets 8, 9 are absent in the vehicle emergency egress system 140 and, instead, the bracket 144 functions to hold the transparent minor panels in the cavities 3, 4. The bracket 144, in one embodiment, includes a pin 146 and a cable 148 for displacing the pin 146 from an engaging position to a releasing position, similar in structure and function to the pin 46 and the cable 48 of the restraint device 41 described above. As such, the bracket 144 may be released by an occupant of the vehicle via a mechanism for pulling the cable 148. Furthermore, the cables 148 of one or more of the restraint devices 141 may be connected such that the brackets 144 of one or more of the restraint devices 141 may be released simultaneously or sequentially via a single mechanism.

Although the drawings and accompanying description illustrate certain exemplary embodiments of a vehicle emergency egress system, it will be apparent that the novel aspects of the vehicle emergency egress system of the invention may also be carried out by utilizing alternative structures, sizes, shapes, and/or materials in embodiments of the vehicle emergency egress system of the present invention. For example, the ballistic criteria for a vehicle can range in lethality requiring variations to the thickness of the armor frame and/or the transparent armor panels, and a particular embodiment of the invention can be adapted to those variations. Accordingly, in some embodiments, the shape and strength requirements of various components of the vehicle emergency egress system, such as the armor frame and the transparent armor panels, may be varied to suit the application, such as ballistic specifications or non-armor-grade applications. Further, as discussed above, embodiments of a vehicle emergency egress system according to the present invention may be configured for use with vehicles other than a HUMVEE® or armored vehicle.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. An emergency egress system for providing an opening for egress from a vehicle, the emergency egress system comprising:
    a frame configured to be directly attached to the vehicle, the frame having a cavity formed therein and defined on a first side by a back surface facing an exterior of the vehicle, the back surface having an opening formed therethrough;
    a panel removably received in the cavity for covering the opening, the back surface retaining the panel in a first direction; and
    at least one bracket removably attached to the frame on the exterior of the vehicle and retaining the panel in a second direction opposite the first direction,
    wherein the at least one bracket is detachable from the frame by an occupant inside the vehicle for removal of the panel to the exterior of the vehicle in the second direction.

2. The emergency egress system of claim 1, wherein the frame is a unitary structure, and the panel or a gasket contacting the panel is adjacent at least one edge surface of the frame extending from the back surface and defining at least one second side of the cavity.

3. The emergency egress system of claim 1, wherein the panel provides at least one of ballistic protection or environmental sealing to an interior of the vehicle when covering the opening.

4. The emergency egress system of claim 1, wherein the at least one bracket is removably attached to the frame via at least one pyrotechnically shearable bolt, and the panel is removable to uncover the opening when the at least one bolt is sheared.

5. The emergency egress system of claim 1, wherein the at least one bracket abuts an exterior surface of the panel for retaining the panel in the cavity and covering the opening.

6. The emergency egress system of claim 1, wherein the at least one bracket comprises a first bracket located at an inboard region of the frame and a second bracket located at an outboard region of the frame relative to the first bracket.

7. The emergency egress system of claim 6, wherein the first bracket comprises a flange abutting an exterior surface of the panel near a first edge, and the second bracket comprises a flange abutting the exterior surface of the panel near a second edge, the flanges of the first and second brackets retaining the panel in the cavity and covering the opening.

8. The emergency egress system of claim 7, further comprising another panel removably received in another cavity of the frame for covering another opening, wherein the first bracket further comprises another flange abutting an exterior surface of the another panel near an edge of the another panel and retaining the another panel in the another cavity and covering the another opening.

9. The emergency egress system of claim 1, wherein the panel comprises a transparent panel.

10. The emergency egress system of claim 9, wherein the panel comprises an armor-grade windshield.

11. The emergency egress system of claim 1, wherein the frame is monolithic.

12. The emergency egress system of claim 1, further comprising a latch coupled to the frame, wherein the at least one bracket is removably attached to the frame via the latch.

13. The emergency egress system of claim 12, wherein the at least one bracket comprises a rod engageable with the latch for removably attaching the at least one bracket to the frame.

14. The emergency egress system of claim 1, further comprising a restraint device comprising:
    a first mounting portion mounted to one of the frame or the at least one bracket and having a first cavity and a second cavity formed therein, the second cavity intersecting the first cavity;
    a second mounting portion mounted to the other of the frame or the at least one bracket and removably received in the first cavity of the first mounting portion; and
    a pin in the second cavity of the first mounting portion, the pin being movable between an engaging position in which the pin engages the second mounting portion for maintaining the at least one bracket coupled to the frame and retaining the panel covering the opening and a releasing position in which the pin does not engage the second mounting portion and the at least one bracket is removable from the frame for removing the panel to uncover the opening.

15. The emergency egress system of claim 14, wherein:
the second mounting portion has a groove formed therein,
the pin comprises a first portion having a first diameter and a second portion having a second diameter smaller than the first diameter,
the first portion is aligned with and extends into the groove when the pin is in the engaging position, and
the second portion is aligned with the groove and the pin does not extend into the groove when the pin is in the releasing position.

16. The emergency egress system of claim 14, wherein the restraint device further comprises a cable extending through the first mounting portion, the cable being displaceable relative to the second mounting portion for moving the pin between the engaging position and the releasing position.

17. The emergency egress system of claim 16, further comprising:
another first mounting portion mounted to one of the frame or another bracket of the at least one bracket;
another second mounting portion mounted to the other of the frame or the another bracket of the at least one bracket; and
another pin being movable for removing the panel to uncover the opening,
wherein the cable extends through the another first mounting portion and is displaceable relative to the another second mounting portion for moving the another pin.

18. The emergency egress system of claim 14, wherein the first mounting portion is mounted to the frame, and the second mounting portion is mounted to the at least one bracket.

19. The emergency egress system of claim 1, further comprising a restraint device comprising:
a first restraint portion having a first cavity and a second cavity formed therein, the second cavity intersecting the first cavity;
a second restraint portion mounted to the frame and removably received in the first cavity of the first restraint portion; and
a pin in the second cavity of the first restraint portion, the pin being movable between an engaging position in which the pin engages the second restraint portion for maintaining the at least one bracket coupled to the frame and retaining the panel covering the opening and a releasing position in which the pin does not engage the second restraint portion and the at least one bracket is removable from the frame for removing the panel to uncover the opening.

20. The emergency egress system of claim 1, wherein the at least one bracket comprises a first restraint portion having a first cavity and a second cavity formed therein, the second cavity intersecting the first cavity, and the emergency egress system further comprises:
a second restraint portion mounted to the frame and removably received in the first cavity of the first restraint portion; and
a pin in the second cavity of the first restraint portion, the pin being movable between an engaging position in which the pin engages the second restraint portion for maintaining the at least one bracket coupled to the frame and retaining the panel covering the opening and a releasing position in which the pin does not engage the second restraint portion and the at least one bracket is removable from the frame for removing the panel to uncover the opening.

21. The emergency egress system of claim 1, wherein the at least one bracket is an annular member.

22. The emergency egress system of claim 1, further comprising a gasket surrounding a periphery of the panel for providing an environmental seal between the panel and the frame.

23. A vehicle comprising:
a window frame; and
an emergency egress system comprising:
a monolithic frame directly attached to the window frame, the monolithic frame having a cavity formed therein and defined on a first side by a back surface facing an exterior of the vehicle, the back surface having an opening formed therethrough;
a panel removably received in the cavity for covering the opening, the back surface retaining the panel in a first direction; and
at least one bracket removably attached to the monolithic frame on the exterior of the vehicle and retaining the panel in a second direction opposite the first direction,
wherein the at least one bracket is detachable from the monolithic frame by an occupant inside the vehicle for removal of the panel to the exterior of the vehicle in the second direction.

* * * * *